United States Patent
Miwa et al.

(10) Patent No.: US 11,571,710 B2
(45) Date of Patent: Feb. 7, 2023

(54) COATING METHOD AND COATING FILM

(71) Applicant: ASAHI KASEI KABUSHIKI KAISHA, Tokyo (JP)

(72) Inventors: Yuichi Miwa, Tokyo (JP); Masakazu Yamauchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 16/959,790

(22) PCT Filed: Dec. 26, 2018

(86) PCT No.: PCT/JP2018/047798
§ 371 (c)(1),
(2) Date: Jul. 2, 2020

(87) PCT Pub. No.: WO2019/138876
PCT Pub. Date: Jul. 18, 2019

(65) Prior Publication Data
US 2020/0339833 A1  Oct. 29, 2020

(30) Foreign Application Priority Data
Jan. 11, 2018  (JP) .............. JP2018-002939

(51) Int. Cl.
B05D 3/02 (2006.01)
B05D 7/24 (2006.01)
B05D 7/00 (2006.01)
C09D 175/04 (2006.01)

(52) U.S. Cl.
CPC .......... B05D 7/542 (2013.01); B05D 3/0254 (2013.01); B05D 7/24 (2013.01); C09D 175/04 (2013.01)

(58) Field of Classification Search
None
See application file for complete search history.

(56) References Cited

U.S. PATENT DOCUMENTS

| | | | |
|---|---|---|---|
| 6,100,326 A | 8/2000 | Richter et al. | |
| 6,180,175 B1 | 1/2001 | Saika et al. | |
| 2008/0226891 A1* | 9/2008 | Chiga .............. | C08G 18/792 428/221 |
| 2009/0274846 A1 | 11/2009 | Wada et al. | |
| 2014/0227534 A1 | 8/2014 | Iwata et al. | |
| 2015/0147577 A1 | 5/2015 | Shigemori et al. | |

FOREIGN PATENT DOCUMENTS

| | | |
|---|---|---|
| CN | 103842095 | 6/2014 |
| DE | 19800286 A1 | 7/1999 |
| EP | 0744422 A1 | 11/1996 |
| EP | 1347004 A1 | 9/2003 |
| EP | 1535939 A1 | 6/2005 |
| EP | 1884546 A1 | 2/2008 |
| EP | 1958982 A2 | 8/2008 |
| GB | 2447741 A | 9/2008 |
| JP | 57-198760 A | 12/1982 |
| JP | 4-001033 B | 1/1992 |
| JP | 7-207220 A | 8/1995 |
| JP | 10-128222 A | 5/1998 |
| JP | 11-005943 A | 1/1999 |
| JP | 2000-302745 A | 10/2000 |
| JP | 2001-226626 A | 8/2001 |
| JP | 2003-019459 A | 1/2003 |
| JP | 2005-068384 A | 3/2005 |
| JP | 2007-084801 A | 4/2007 |

(Continued)

OTHER PUBLICATIONS

European Search Report, EPO, Application No. 18899420.6, dated Feb. 4, 2021.

(Continued)

*Primary Examiner* — Michael P. Rodriguez
(74) *Attorney, Agent, or Firm* — Greenblum & Bernstein, P.L.C.

(57) ABSTRACT

A coating method in which a first coating composition is applied to the surface of an object to be coated to obtain a first uncured coating film, a second coating composition is applied to the first uncured coating film to obtain a second uncured coating film, and the first uncured coating film and the second uncured coating film are then cured simultaneously by heating, wherein the first coating composition contains a hydroxyl group-containing resin component and the second coating composition contains an isocyanate component containing a triisocyanate represented by general formula (I) (in the formula, the multiple $Y^1$ each independently are a single bond or a C1-20 divalent hydrocarbon group which optionally contains one or more selected from the group consisting of an ester group and an ether group, and $R^1$ is a hydrogen atom or a C1-12 monovalent hydrocarbon group) and the above-mentioned hydroxyl group-containing resin component, is provided.

(I)

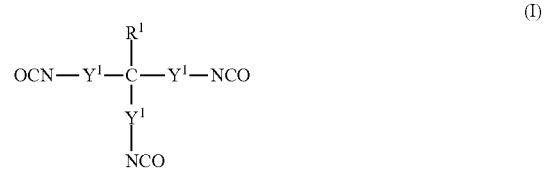

15 Claims, No Drawings

(56) References Cited

FOREIGN PATENT DOCUMENTS

| JP | 2008-062118 A | 3/2008 | |
|---|---|---|---|
| JP | 2008-200587 A | 9/2008 | |
| JP | 2014-014763 A | 1/2014 | |
| JP | 2014-070151 A | 4/2014 | |
| JP | 2015-066543 A | 4/2015 | |
| WO | 1996/17881 A1 | 6/1996 | |
| WO | 2008/050756 A1 | 5/2008 | |
| WO | WO-2008050756 A1 * | 5/2008 | ......... C08G 18/6254 |

OTHER PUBLICATIONS

ISR issued in International Patent Application No. PCT/JP2018/047798, dated Apr. 9, 2019, English translation.
Written Opinion issued in Int'l Patent App. No. PCT/JP2018/047798, dated Apr. 9, 2019, English translation.

* cited by examiner

COATING METHOD AND COATING FILM

TECHNICAL FIELD

The present invention relates to a coating method and a coating film.

The present invention claims priority on the basis of Japanese Patent Application No. 2018-002939, filed in Japan on Jan. 11, 2018, the content of which is incorporated herein by reference.

BACKGROUND OF THE INVENTION

In recent years, the use of an aqueous coating composition as a base coating material on an automobile outside plate, for example, has been increased. The aqueous coating composition is almost free from any organic solvent, and therefore is preferable from the viewpoint of environmental pollution preventability. For example, Patent Document 1 discloses an aqueous coating composition containing both a water-based polyol and a particular melamine.

In addition, Patent Documents 2 and 3 disclose methods for forming a coating film by coating a base coating material that is not cured substantially by heat, and then coating a clear coating material that is cured by heat, followed by conducting heating to cure multilaered uncured coating films simultaneously.

DOCUMENTS OF RELATED ART

Patent Documents

Patent Document 1: Japanese Unexamined Patent Application Publication No. Hei 7-207220
Patent Document 2: Japanese Unexamined Patent Application Publication No. Hei 10-128222
Patent Document 3: Japanese Unexamined Patent Application Publication No. 2001-226626

SUMMARY OF THE INVENTION

Problems to be Solved by the Invention

However, there is a case in which the chipping resistance realized by the technique disclosed in Patent Document 1 is not sufficient.

Although the chipping resistance and the curability of the resultant multilayered coating films are realized by the technique disclosed in Patent Documents 2 and 3, the coating film hardness of the resultant multilayered coating films is required to be improved. In addition, the penetration of a curing agent contained in the clear coating material-containing layer into the base coating material-containing layer is desired to be improved.

The present invention has been made in view of the above-mentioned circumstances, and aims to provide a coating film having excellent coating film hardness due to the favorable penetration property into a lower layer, and a coating method for forming the coating film.

Means to Solve the Problems

The present invention involves the following embodiments.

(1) A coating method including: obtaining a first uncured coating film by applying a first coating composition to a surface of an object to be coated; obtaining a second uncured coating film by applying a second coating composition to the first uncured coating film; and curing simultaneously the first uncured coating film and the second uncured coating film by conducting heating,
wherein the first coating composition contains a hydroxyl group-containing resin component and
the second coating composition contains: an isocyanate component having a triisocyanate of general formula (I); and the hydroxyl group-containing resin component.

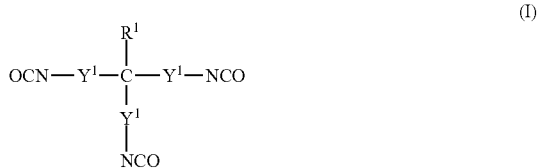

In the general formula (I), multiple Y each independently represents a single bond or a C1-20 divalent hydrocarbon group which may have at least one selected from the group consisting of an ester group and an ether group. The multiple $Y^1$ may be identical to or different from each other. $R^1$ is a hydrogen atom or a C1-12 monovalent hydrocarbon group.
(2) The coating method according to (1) mentioned above, wherein the first uncured coating film and the second uncured coating film are cured simultaneously by the isocyanate component (a).
(3) The coating method according to (1) or (2) mentioned above, wherein the second coating composition further contains a polyisocyanate component (b) having an isocyanurate structure formed by at least one kind of isocyanates selected from the group consisting of aliphatic isocyanates and alicyclic isocyanates.
(4) The coating method according to (3) mentioned above, wherein the mass ratio (a):(b) of the isocyanate component (a) and the polyisocyanate component (b) is 4:6 to 9:1.
(5) The coating method according to any one of (1) to (4), wherein, in the second coating composition, a molar ratio (NCO/OH) of an isocyanate group (NCO group) in the isocyanate component, relative to a hydroxyl group (OH group) in the hydroxyl group-containing resin component, is 1.0 to 5.0.
(6) The coating method according to any one of (1) to (5) mentioned above, wherein the triisocyanate has an ester group.
(7) The coating method according to any one of (1) to (6) mentioned above, wherein the triisocyanate is a lysine triisocyanate.
(8) The coating method according to any one of (1) to (7), wherein, the first coating composition further contains an isocyanate component, and, in the first coating composition, a molar ratio (NCO/OH) of an isocyanate group (NCO group) in the isocyanate component, relative to a hydroxyl group (OH group) in the hydroxyl group-containing resin component, is 1.0 or less.
(9) The coating method according to (8) mentioned above, wherein the isocyanate component contained in the first coating composition contains a blocked isocyanate.
(10) The coating method according to (1) mentioned above, wherein the object to be coated is an uncured coating film.
(11) The coating method according to (10) mentioned above, wherein the first uncured coating film, the second uncured coating film and the object to be coated are cured simultaneously by the isocyanate component (a).

(12) The coating method according to (10) or (11) mentioned above, in which the second coating composition further contains a polyisocyanate component (b) having an isocyanurate structure formed by at least one kind of isocyanates selected from the group consisting of aliphatic isocyanates and alicyclic isocyanates.
(13) The coating method according to (12) mentioned above, wherein the mass ratio (a):(b) of the isocyanate component (a) and the polyisocyanate component (b) is 4:6 to 9:1.
(14) The coating method according to any one of (10) to (13) mentioned above, wherein, in the second coating composition, a molar ratio (NCO/OH) of an isocyanate group (NCO group) in the isocyanate component, relative to a hydroxyl group (OH groups) in the hydroxyl group-containing resin component, is 1.0 to 5.0.
(15) The coating method according to any one of (10) to (14) mentioned above, wherein the triisocyanate has an ester group.
(16) The coating method according to any one of (10) to (15) mentioned above, wherein the triisocyanate is a lysine triisocyanate.
(17) The coating method according to any one of (10) to (16) mentioned above, wherein, the first coating composition further contains an isocyanate component, and, in the first coating composition, a molar ratio (NCO/OH) of an isocyanate group (NCO group) in the isocyanate component, relative to a hydroxyl group (OH group) in the hydroxyl group-containing resin component, is 1.0 or less.
(18) The coating method according to (17) mentioned above, wherein the isocyanate component contained in the first coating composition contains a blocked isocyanate.
(19) A coating film formed by the coating method of any one of (1) to (18) mentioned above.

Effects of the Invention

The coating method according to the present embodiment makes it possible to obtain a coating film having excellent coating film hardness, because the penetration property of an isocyanate component into a lower layer, the isocyanate component serving as a curing agent, is favorable.

EMBODIMENTS FOR CARRYING OUT THE INVENTION

Embodiments of the present invention (hereinafter, referred to as "the present embodiment" simply) will be explained below in detail. The present embodiments shown below are examples that describe the present invention and are not intended to limit the present invention to the following embodiments. The present invention may be modified appropriately within the gist thereof.
In the present specification, the term "polyisocyanate" refers to a polymer in which plural monomers having at least two isocyanate groups (—NCO) are bonded together.
In the present specification, the term "polyol" refers to a compound having at least two hydroxy groups (—OH).
<<Coating Method>>
A coating method according to the first embodiment includes: obtaining a first uncured coating film by applying a first coating composition onto a surface of an object to be coated; obtaining a second uncured coating film by applying a second coating composition onto the first uncured coating film; and curing simultaneously the first uncured coating film and the second uncured coating film by conducting heating.

The first coating composition contains a hydroxyl group-containing resin component.
The second coating composition contains: an isocyanate component (a) having a triisocyanate of general formula (I) shown below; and the hydroxyl group-containing resin component.

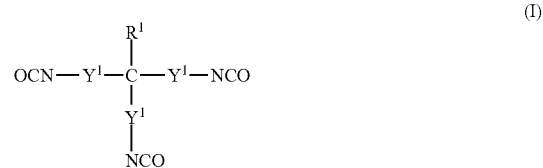

In the general formula (I), multiple $Y^1$ each independently represents a single bond or a C1-20 divalent hydrocarbon group which may have at least one selected from the group consisting of an ester structure and an ether structure. The multiple $Y^1$ may be identical to or different from each other. $R^1$ is a hydrogen atom or a C1-12 monovalent hydrocarbon group.

It is preferable in the coating method according to the present embodiment that a part of the isocyanate component (a) contained in the second coating composition be penetrated into the first uncured coating film by laminating the second uncured coating film on the first uncured coating film to make the isocyanate component (a) present in both the first uncured coating film and the second uncured coating film, followed by curing both the first uncured coating film and the second uncured coating film by conducting heating.

In the present specification, the term "coating film" means a cured product formed by curing the coating composition, unless particularly mentioned. That is, the coating film is formed by curing an uncured coating film.

The first uncured coating film and the second uncured coating film may be formed by laminating the first coating composition and the second coating composition on an object to be coated, such as a substrate or a coating film, respectively, using a coating method, such as roll coating, curtain flow coating, spray coating, bell coating, or electrostatic coating, in the coating method according to the present embodiment. Examples of the substrate include metal (such as steel plate or surface-treated steel plate), plastic, wood, film, and inorganic materials. Examples of the coating film include: a coating film formed by applying both the main agent such as a polyol and a curing agent such as a (blocked) polyisocyanate or melamine, and then curing them; and an uncured coating film before conducting curing. In the coating method according to the present embodiment, the object to be coated is preferably an uncured coating film.

Each of the cured film thickness of the first and second coating films according to the present embodiment is preferably 10 μm or more, and more preferably 15 μm or more, but preferably 60 μm or less, and more preferably 50 μm or less. In the case where the cured film thickness is within the range, the durability of the coating film can be maintained.

The heating temperature at which the first and second uncured coating films are cured simultaneously after the second uncured coating film is obtained in the coating method according to the present embodiment is preferably 60° C. or higher, and more preferably 80° C. or higher, but preferably 160° C. or lower, and more preferably 150° C. or lower.

The heating time is preferably 10 minutes or longer, and more preferably 15 minutes or longer, but preferably 40 minutes or less, and more preferably 35 minutes or less. In the case where the heating temperature and the heating time are within the above-mentioned ranges, the curability of the coating film and the yellowing resistance of the coating film are improved.

In the coating method according to the present embodiment, pre-heating may be conducted for a short time after obtaining the first uncured coating film, and/or, before coating the first uncured coating film on an uncured coating film as a substrate. The pre-heating is a step in which drying is conducted at a low temperature of approximately 70° C. to 80° C. for a short time of approximately 1 minute to 5 minutes under conditions in which the first uncured coating film is not cured.

The coating composition used in the coating method according to the preset embodiment will be explained specifically below.

<Coating Composition>

The first coating composition contains a hydroxyl group-containing resin component. The first coating composition may further contain an isocyanate component.

The second coating composition contains: an isocyanate component (a) of a triisocyanate of the following general formula (I) (hereinafter, may be referred to as "triisocyanate (I)"); and a hydroxyl group-containing resin component.

It is preferable that the second coating composition further contain a polyisocyanate component (b) having a isocyanurate structure formed by at least one kind of isocyanate selected from the group consisting of aliphatic isocyanates and alicyclic isocyanates from the viewpoint of the coating film hardness.

Each components of the first coating composition and the second coating composition will be explained below specifically.

[Isocyanate Component (a)]

An isocyanate component (a) contained in the second coating composition contains a triisocyanate of the following general formula (I) (hereinafter, may be referred to as "triisocyanate (I)").

In the case where the first coating composition contains an isocyanate component, the triisocyanate (I) may be contained.

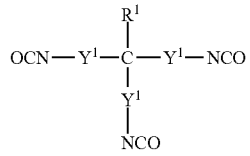

(Triisocyanate (I))

(1) $Y^1$

In the general formula (I), multiple Y each independently represents a single bond or a C1-20 divalent hydrocarbon group having at least one selected from the group consisting of an ester structure and an ether structure. The multiple $Y^1$ may be identical to or different from each other.

The C1-20 divalent hydrocarbon group that does not contain an ester structure or an ether structure as $Y^1$ may be an aliphatic group or an aromatic group. The aliphatic group may be linear, branched or cyclic.

Examples of the linear or branched aliphatic group include alkanediyl groups (alkylene groups), and alkylidene groups.

Examples of the cyclic aliphatic groups include cycloalkylene groups.

Examples of the aromatic group include arylene groups such as a phenylene group.

Among these, the C1-20 divalent hydrocarbon group is preferably an alkylene group.

Examples of the alkylene group include a methylene group, a dimethylene group, a trimethylene group, a tetramethylene group, and an octamethylene group. Among these, the alkylene group is preferably a tetramethylene group.

Examples of the C1-20 divalent hydrocarbon group having at least one selected from the group consisting of an ester structure (—COO—) and an ether structure (—O—) as $Y^1$ include groups of the following formula (II) (hereinafter, may be referred to as "group (11)").

In the general formula (II), *1 represents a bond with C in the general formula (I), and *2 represents a bond with N in the general formula (I).

n1 and n2 represent integers satisfying the formula: 1≤n1+n2≤20. That is, both n1 and n2 do not represent 0 simultaneously, and n2 is preferably 1 or more.

Among these, it is preferable that n1 and n2 each independently represent an integer of 0 to 20, more preferably 0 to 4, and even more preferably 0 to 2.

The combination of n1 and n2 is preferably the combination in which n1 is 0 and n2 is 2, or the combination in which n1 is 2 and n2 is 2, for example.

In the group (II), X preferably represents an ester structure.

In the case where at least one of the multiple $Y^1$ has at least one selected from the group consisting of aliphatic groups and aromatic groups, the viscosity of the isocyanate component can be further decreased.

In addition, in the case where at least one of the multiple $Y^1$ has at least one selected from the group consisting of aliphatic groups and alicyclic groups, the weather resistance of the coating film can be further improved.

In the case where at least one of the multiple $Y^1$ has an ester structure, the heat resistance of the isocyanate component can be further improved.

(2) $R^1$ $R^1$ is a hydrogen atom or a C1-12 monovalent hydrocarbon group. The hydrocarbon group as $R^1$ is not particularly limited, and examples thereof include alkyl groups, alkenyl groups, and alkynyl groups. Among these, $R^1$ is preferably a hydrogen atom.

Preferable examples of the triisocyanate (I) include 4-isocyanatemethyl-1,8-octamethylene diisocyanate disclosed in International Patent Application Publication No. WO 1996/17881 (Reference Example 1) (hereinafter, may be referred to as "NTI", the molecular weight of which is 251), 1,3,6-hexamethylene triisocyanate disclosed in Japanese Unexamined Patent Application Publication No. Sho 57-198760 (Reference Example 2) (hereinafter, may be referred to as "HTI", the molecular weight of which is 209), bis(2-isocyanatoethyl) 2-isocyanatoglutarate disclosed in Japanese Examined Patent Application Publication No. Hei 4-1033 (Reference Example 3) (hereinafter, may be referred to as "GTI", the molecular weigh of which is 311), lysine triisocyanate disclosed in Japanese Unexamined Patent Application Publication No. Sho 53-135931 (Reference Example 4) (hereinafter, may be referred to as "LTI", the molecular weight of which is 267). LTI, NTI or GTI is preferable, and LTI is more preferable from the viewpoint of the penetration property of the isocyanate component into the first uncured coating film and the reactivity with an isocyanate group.

The lower limit of the molecular weight of the triisocyanate (I) is preferably 139, more preferably 150, even more preferably 180, and particularly preferably 200.

On the other hand, the upper limit of the molecular weight of the triisocyanate (I) is preferably 1000, more preferably 800, even more preferably 600, and particularly preferably 400.

That is, the molecular weight of the triisocyanate (I) is preferably 139 to 1000, more preferably 150 to 800, even more preferably 180 to 600, and particularly preferably 200 to 400.

In the case where the molecular weight of the triisocyanate (I) is the above-mentioned lower limit or more, the crystallization can be further suppressed. In the case where the molecular weight thereof is the above-mentioned upper limit or less, the viscosity thereof can be further easily decreased.

The triisocyanate (I) may be obtained, for example, by subjecting an amino acid derivative or an amine such as an ether amine or an alkyl triamine to isocyanate-forming reaction.

Examples of the amino acid derivative include 2,5-diaminovaleric acid, 2,6-diaminohexanoic acid, asparaginic acid, and glutamic acid. These amino acid derivatives are diamine monocarboxylates or monoamine dicarboxylate. Thus, the number of amino groups can be controlled by esterifying carboxyl groups with an alkanol amine such as ethanolamine. Alternatively, the number of amino groups can be controlled by esterifying carboxy groups with an alcohol such as methanol.

The resultant amine having an ester structure can be made to be a triisocyanate compound having an ester by phosgenation of the amine.

Examples of the ether amine include polyoxyalkylenetriamine manufactured by MITSUI FINE CHEMICAL Inc., under the trade name of "D403". The ether amine is a triamine, and may be made to be a triisocyanate compound having an ether structure by phosgenation of amine or the like.

Examples of the alkyl triamine include 4-aminomethyl-1,8-octanediamine. The alkyl triamine can be made to be a triisocyanate having only hydrocarbon by phosgenation of the amine.

(Polyisocyanate Component (b))

A polyisocyanate component (b) has an isocyanurate structure formed by at least one kind of isocyanate selected from the group consisting of aliphatic isocyanates and alicyclic isocyanates.

The aliphatic isocyanates are preferably C4-30 aliphatic isocyanates, and examples thereof include tetramethylene-1,4-diisocyanate, pentamethylene-1,5-diisocyanate, hexamethylene diisocyanate (hereinafter, may be referred to as "HDI"), 2,2,4-trimethylhexamethylene-1,6-diisocyanate, lysine diisocyanate, and the above-mentioned triisocyanates.

The alicyclic isocyanates are preferably C8-30 alicyclic isocyanates, and examples thereof include isophorone diisocyanate (hereinafter, may be referred to as "IPDI"), 1,3-bis(isocyanatomethyl)-cyclohexane, and 4,4'-dicyclohexylmethane diisocyanate.

The polyisocyanate is obtained from at least one kind selected from the group consisting of the above-mentioned aliphatic isocyanates and alicyclic isocyanates, and contains an isocyanurate structure.

The term "isocyanurate structure" generally means a functional group derived from a polyisocyanate formed by three molecules of diisocyanates.

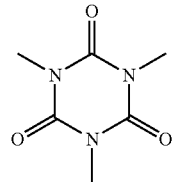

(III)

Examples of the method for producing an isocyanurate structure-containing polyisocyanate include a method in which a catalyst is used. The isocyanurate-forming catalyst is not particularly limited, and is generally preferably basic. Examples thereof include: (1) hydroxides of tetraalkyl ammonium such as tetramethyl ammonium, tetraethyl ammonium, or tetrabutyl ammonium; organic weak acid salts thereof, such as acetic acid salts, octylic acid salts, myristic acid salts, and benzoic acid salts; (2) hydroxides of hydroxyalkyl ammonium, such as trimethylhydroxyethyl ammonium, trimethylhydroxypropyl ammonium, triethylhydroxyethyl ammonium, or triethylhydroxypropyl ammonium; organic weak acid salts thereof, such as acetic acid salts, octylic acid salts, myristic acid salts, and benzoic acid salts; (3) metal salts, such as tin salts, zinc salts, or lead salts, of alkylcarbonates, such as acetic acid, caproic acid, octylic acid, or myristic acid; (4) metal alcoholates such as sodium alcoholates and potassium alcoholates; (5) aminosilyl group-containing compounds such as hexamethylene disilazane; (6) Mannich bases; (7) combinations of tertiary amines and epoxy compounds; and (8) phosphorus-based compounds such as tributylphosphine.

Among these, organic weak acid salts of tetraammonium is preferable, and organic weak acid salts of tetraalkyl ammonium is more preferable, from the viewpoint of suppressibility of causing unnecessary by-products.

The catalyst may be diluted with a solvent or added therewith from the viewpoint of the mixability with the catalyst. Examples of the solvent include 1-methylpyrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methylethylketone, acetone, methylisobutylketone propylene glycol monomethyl ether acetate, ethanol, methanol, iso-propanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, isohexane, cyclohexane, solvent naphtha, mineral spirits, and dimethylformamide. At least two kinds thereof may be used together.

The isocyanurate-forming reaction temperature is preferably 50° C. to 120° C., and more preferably 60° C. to 90° C. In the case where the isocyanurate-forming reaction temperature is 120° C. or less, the coloration tends to be effectively prevented, which is preferable.

The isocyanurate-forming reaction may be terminated, for example, by adding an acid compound such as a phosphoric acid, or an acidic phosphoric acid ester without particular limitations.

The mass ratio (a):(b) of the isocyanate component (a) and the polyisocyanate component (b) is preferably 4:6 to 9:1, and more preferably 5:5 to 9:1. In the case where the mass ratio (a):(b) is within the above-mentioned range, the hardness of the coating film increases.

(Other Isocyanate Compound)

The isocyanate component contained in the second coating composition may contain additional isocyanate compounds different from the isocyanate component (a) and the polyisocyanate component (b).

In the case where the first coating composition contains an isocyanate component, an isocyanate compound different from the triisocyanate may be contained.

Examples of the "isocyanate compound different from the isocyanate component (a) and the polyisocyanate component (b)" include: polyisocyanates obtained from isocyanates different from the above-mentioned aliphatic isocyanates or alicyclic isocyanate; and polyisocyanates obtained from a structure different from an isocyanurate structure obtained from aliphatic isocyanates or alicyclic isocyanates.

Examples of the isocyanates different from the aliphatic isocyanates or the alicyclic isocyanates include aromatic isocyanates. Examples of the aromatic isocyanates include 2,4-tolylene diisocyanate, 2,6-tolylene diisocyanate, 4,4'-diphenylmethane diisocyanate, naphthalene diisocyanate, and xylylene diisocyanate (hereinafter, may be referred to as "XD1").

The structure different from the isocyanurate structure may be at least one selected from the group consisting of an allophanate structure, an iminodioxadiazinedione structure, a biuret structure and a urethane structure.

The "allophanate structure" is generally formed by reacting a hydroxyl group of an alcohol and an isocyanate group and is a structure of the following formula (VI).

The "iminooxadiazinedione structure" is generally formed by reacting three isocyanate groups, and is a structure of the following formula (VII).

The "biuret structure" is generally formed by reacting three isocyanate groups and a biuret-forming agent, and is a structure of the following formula (VII).

The "urethane structure" is generally formed by reacting one isocyanate group and one hydroxyl group, and is a structure of the following formula (IX).

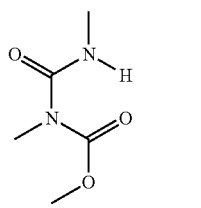
(VI)

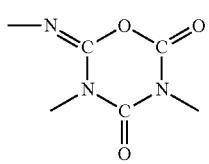
(VII)

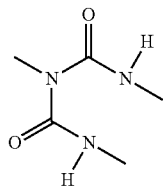
(VIII)

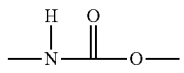
(IX)

Among these, an iminodioxadiazinedione structure is preferably contained from the viewpoint of weather resistance, and an allophanate structure is preferably contained from the viewpoint of workability due to the decreased viscosity.

Examples of the "isocyanate compound different from the triisocyanate" to be contained in the first coating composition include a polyisocyanate of HDI having an isocyanurate structure, a polyisocyanate of HDI having an uretdione structure, and a polyisocyanate of IPDI having an isocyanurate structure.

(2-1) Preparation Method of Polyisocyanate

Preparation Method of Polyisocyanate Containing an Iminooxadiazinedione Structure Examples of the preparation method of a polyisocyanate containing an iminooxadiazinedione structure include a method in which a catalyst is used. Examples of the catalyst include the following catalysts (i) to (x) shown below.

(i) (Poly)hydrogen fluorides of general formula M[Fn] or M[Fn(HF)m](in the formulae, m and n each represents an integer satisfying the relationship of m/n>0, M represents a n-charged cation (mixture) or at least one radical having a total valency of n).

(ii) Compounds composed of: general formula $R^{11}$—C($R^{12}$)$_2$—C(O)O—, or, $R^{21}$=C$R^{22}$—C(O)O— (in the formulae, $R^{11}$ and $R^{21}$ each independently represents a linear, branched, or cyclic C1-30 perfluoroalkyl group, and $R^{12}$ and $R^{22}$ each independently represents at least one selected from the group consisting of a hydrogen atom, and, C1-20 alkyl groups and aryl groups, which may contain a hetero atom); and either a tetra ammonium cation or a tetra phosphonium cation.

(iii) Hydroxides and organic weak acid salts of tetra ammoniums such as benzyltrialkyl ammonium or tetraalkyl ammonium.

(iv) Hydroxides and organic weak acid salts of hydroxyalkyl ammoniums.

(v) Metal salts of alkylcarbonates.

(vi) Alcoholates of metal such as sodium or potassium.

(vii) Aminosilyl group-containing compounds such as hexamethylene disilazane.

(viii) Mannich bases.

(ix) Combinations of tertiary amines and epoxy compounds.

(x) Phosphorus-based compounds such as tributylphosphine.

Specific examples of the (poly)hydrogen fluorides (i) mentioned above include tetramethyl ammonium fluoride hydrates and tetraethyl ammonium fluorides.

Specific examples of the compounds (ii) mentioned above include 3,3,3-trifluorocarboxylic acid, 4,4,4,3,3-pentafluorobutanoic acid, 5,5,5,4,4,3,3-heptafluoropentanoic acid, and 3,3-difluoropropa-2-enoic acid.

Examples of the tetraalkyl ammonium include tetramethyl ammonium, tetraethyl ammonium, and tetrabutyl ammonium.

Examples of the hydroxyalkyl ammonium include trimethylhydroxyethyl ammonium, trimethylhydroxypropyl ammonium, triethylhydroxyethyl ammonium, and triethylhydroxypropyl ammonium.

Examples of the benzyltrialkyl ammonium include benzyltrimethyl ammonium, benzyltriethyl ammonium, and benzyltributyl ammonium.

Examples of the organic weak acid salts include acetic acid salts, octylic acid salts, myristic acid salts, and benzoic acid salts.

Examples of the alkylcarbonate include acetic acid, caproic acid, octylic acid, and myristic acid.

Examples of metal contained in the metal salts include tin, zinc, and lead.

Among these, the catalyst is preferably tetramethyl ammonium fluoride hydrate from the viewpoint of the easy availability, preferably the above-mentioned compound (ii) from the viewpoint of the safety, preferably organic weak acid salts of tetraammonium from the viewpoint of difficulty in causing unrequired by-products, and more preferably organic acid salts of benzyltrimethyl ammonium or organic acid salts of tetramethyl ammonium.

The lower limit of the reaction temperature is preferably 40° C., more preferably 50° C., and even more preferably 55° C.

In contrast, the upper limit of the reaction temperature is preferably 120° C., more preferably 100° C., even more preferably 90° C., and particularly preferably 80° C.

That is, the reaction temperature is preferably 40° C. to 120° C., more preferably 50° C. to 100° C., even more preferably 55° C. to 90° C., and particularly preferably 55° C. to 80° C.

In the case where the reaction temperature is the lower limit or more, the reaction speed can be favorably maintained. In the case where the reaction temperature is the upper limit or less, the coloration of polyisocyanate can be further suppressed.

The reaction can be terminated by adding an acidic compound such as a phosphoric acid, or an acidic phosphoric acid ester without particular limitations.

Preparation Method of Polyisocyanate Having an Allophanate Structure

Examples of the preparation method of a polyisocyanate having an allophanate structure include a method in which heating is conducted and a method in which a catalyst is used.

Although an allophanate-forming catalyst is not particularly limited, examples of the available allophanate-forming catalyst include zirconyl compounds of the following general formula (VIII) (hereinafter, may be referred to as "zirconyl compound (VIII)") and zirconium alcoholates of the following general formula (IX) (hereinafter, may be referred to as "zirconium alcoholate (IX)"). The allophanate-forming catalyst may be used alone or in combination of at least two thereof.

Among these, the zirconyl compound (VIII) is preferably used as an allophanate-forming catalyst so as to obtain a polyisocyanate having an increased production ratio of an allophanate structure.

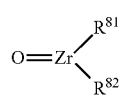

(VIII)

In the general formula (VIII), $R^{81}$ and $R^{82}$, each independently, represents an organic carboniumoxy group, an alkoxy group, an alkyl group, a halogen group or a residual group obtained by removing a hydrogen from an inorganic acid.

In the present specification, the term "organic carboniumoxy group" means a residual group formed by removing hydrogen from an organic carboxylic acid. That is, when both $R^{81}$ and $R^{82}$ in the general formula (VIII) are organic carboniumoxy groups, the zirconyl compound is a zirconyl carboxylate.

Examples of the organic carboxylic acid include aliphatic carboxylic acids, alicyclic carboxylic acids, unsaturated carboxylic acids, aromatic carboxylic acids, hydroxyl group-containing carboxylic acids and halogenated alkylcarbonates, and polybasic carboxylic acids. Examples of the polybasic acidic carboxylic acids include dicarboxylic acids and tricarboxylic acids.

Specific examples of the zirconyl compound (VITI) include zirconyl halide, zirconyl carboxylate, zirconyl dialkyl, zirconyl dialcoholate, zirconyl carbonate, zirconyl lead sulfate and zirconyl nitrate. Among these, zirconyl carboxylate is preferable.

Examples of the zirconyl carboxylate include saturated aliphatic carboxylate, saturated cyclic carboxylate, unsaturated aliphatic carboxylates, and aromatic carboxylate.

Examples of the saturated aliphatic carboxylate include zirconyl formate, zirconyl acetate, zirconyl propionate, zirconyl butanoate, zirconyl pentanoate, zirconyl hexanoate, zirconyl caproate, zirconyl octanoate zirconyl 2-ethylhexanoate, zirconyl decanoate, zirconyl dodecanoate, zirconyl teradecanoate and zirconyl pentadecanoate Examples of the saturated cyclic carboxylic acid include zirconyl cyclohexanecarboxylate, zirconyl cyclopentanecarboxylate, and zirconyl naphthenate.

Examples of the unsaturated aliphatic carboxylate include zirconyl oleate, zirconyl linolate and zirconyl linolenate.

Examples of the aromatic carboxylate include zirconyl benzoate, zirconyl toluylate and zirconyl diphenylacetate.

Among these, zirconyl naphthenate, zirconyl 2-ethylhexanoate or zirconyl acetate is particularly preferable as the zirconyl carboxylate, in terms of easy industrial availability.

(IX)

In the general formula (IX), $R^{91}$, $R^{92}$, $R^{93}$ and $R^{94}$, each independently, represents an alkyl group, an alkenyl group or an alkynyl group.

Examples of an alcohol used as a raw material of the zirconium alcoholate (IX) include saturated aliphatic alcohols, saturated cyclic aliphatic alcohols, unsaturated aliphatic alcohols, and polyvalent alcohols.

Examples of the saturated aliphatic alcohols include methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol.

Examples of the saturated cyclic aliphatic alcohols include cyclohexanol.

Examples of the unsaturated aliphatic alcohols include ethanal, propanal, butanal and 2-hydroxyethyl acrylate.

Examples of the polyvalent alcohol include diols and triols.

Examples of the diols include ethylene glycol, propanediol, 1,4-butanediol, 1,3-butanediol, 1,6-hexanediol, 1,4-hexanediol, 1,6-cyclohexanediol and 1,4-cyclohexanediol.

Examples of the triols include glycerin.

Among these, tetra-n-propoxyzirconium, tetraisopropoxyzirconium, tetra-n-propoxyzirconium and tetra-n-butoxyzirconium are preferable as the zirconium alcoholate (IX), in terms of easy industrial availability thereof.

The allophanate-forming reaction temperature is preferably 60° C. to 160° C., more preferably 70° C. to 160° C., and even more preferably 80° C. to 160° C. When the temperature is equal to or less than the upper limit, there is a tendency for the side-reaction to be further suppressed and for the coloration of the resultant allophanate group-containing polyisocyanate to be further effectively inhibited.

The allophanate-forming reaction may be terminated by adding, for example, an acid compound such as an acid compound of phosphoric acid, sulfuric acid, nitric acid, chloroacetic acid, benzoyl chloride and a sulfonic acid ester agent, an ion exchange resin, a chelating agent or a chelating resin, without particular limitations.

Examples of the acid compound of phosphoric acid include phosphoric acid, pyrophosphoric acid, metaphosphoric acid, polyphosphoric acid and alkyl esters thereof. It is preferable to use at least one selected from these acid compounds of phosphoric acid as a terminating agent.

Preparation Method of Polyisocyanate Having a Biuret Structure

Examples of the method for producing a polyisocyanate having a biuret structure include a method in which a biuret-forming agent is used.

Although the biuret-forming agent is not particularly limited, examples thereof include water, monovalent tertiary alcohols, formic acid, hydrogen sulfide, organic primary monoamines, and organic primary diamines.

The content of isocyanate groups, relative to 1 mol of the biuret-forming agent, is preferably 6 mol or more, more preferably 10 mol or more, and even more preferably 10 mol to 80 mol. In the case where the content is the lower limit or more, the viscosity of the resultant polyisocyanate having a biuret structure is sufficiently decreased. In the case where the content is the upper limit or less, the curability of the resultant coating composition can be maintained further favorably.

In the case of the biuret-forming reaction, a solvent may be used. The solvent is preferably a solvent in which either a triisocyanate or a diisocyanate, and a biuret-forming agent are dissolved, and a uniform phase can be formed under reaction conditions. The solvent is preferably an ethylene glycol-based solvent or a phosphoric acid-based solvent. The solvent may be used alone or in combination of at least two thereof.

Specific examples of the ethylene glycol-based solvent include ethylene glycol monomethyl ether acetate, ethylene glycol monoethyl ether acetate, ethylene glycol mono-n-propyl ether acetate, ethylene glycol monoisopropyl ether acetate, ethylene glycol mono-n-butyl ether acetate, ethylene glycol diacetate, ethylene glycol dimethyl ether, ethylene glycol diethyl ether, ethylene glycol di-n-propyl ether, ethylene glycol diisopropyl ether, ethylene glycol di-n-butyl ether, ethylene glycol methylethyl ether, ethylene glycol methylisopropyl ether, ethylene glycol methyl-n-butyl ether, ethylene glycol ethyl-n-propyl ether, ethylene glycol ethylisopropyl ether, ethylene glycol ethyl-n-butyl ether, ethylene glycol n-propyl-n-butyl ether, ethylene glycol isopropyl-n-butyl ether, diethylene glycol monomethyl ether acetate, diethylene glycol monoethyl ether acetate, diethylene glycol mono-n-propyl ether acetate, diethylene glycol monoisopropyl ether acetate, diethylene glycol mono-n-butyl ether acetate, diethylene glycol diacetate, diethylene glycol dimethyl ether, diethylene glycol diethyl ether, diethylene glycol di-n-propyl ether, diethylene glycol diisopropyl ether, diethylene glycol di-n-butyl ether, diethylene glycol methylethyl ether, diethylene glycol methylisopropyl ether, diethylene glycol methyl-n-propyl ether, diethylene glycol methyl-n-butyl ether, diethylene glycol ethylisopropyl ether, diethylene glycol ethyl-n-propyl ether, diethylene glycol ethyl-n-butyl ether, diethylene glycol n-propyl-n-butyl ether, and diethylene glycol isopropyl-n-butylether.

Among these, ethylene glycol monomethyl ether acetate, ethylene glycol monoethyl ether acetate, ethylene glycol diacetate and diethylene glycol dimethyl ether are preferable, as the ethylene glycol-based solvent.

Specific examples of the phosphoric acid-based solvent include trimethyl phosphate, triethyl phosphate, tripropyl phosphate, and tributyl phosphate.

Among these, the phosphoric acid-based solvent is preferably trimethyl phosphate or triethyl phosphate.

The biuret-forming reaction temperature is preferably 70° C. to 200° C., and more preferably 90° C. to 180° C. When the temperature is equal to or less than the upper limit, there is a tendency for the coloration to be further effectively inhibited.

(3) Blocked Isocyanate

In the case where the first coating composition contains an isocyanate component, the isocyanate component may contain a blocked isocyanate. The blocked isocyanate is an isocyanate compound in which an isocyanate group is protected by a blocking agent that dissociates when being heated.

Examples of the isocyanate compound to be used to prepare the blocked isocyanate include the same compounds as those described as the above-mentioned "(1) triisocyanate (I)" and "(2) isocyanate compound different from the triisocyanate", and also include polyisocyanates.

Among these, a polyisocyanate obtained from aliphatic diisocyanates is preferably contained, and a polyisocyanate obtained from diisocyanates containing HDI is more preferably contained, as an isocyanate compound to be used to prepare a blocked isocyanate, from the viewpoint of the weather resistance. In addition, the triisocyanate (I) is preferably contained from the viewpoint of the crosslinkability.

Examples of the blocking agent include alcohol-based compounds, alkylphenol-based compounds, phenol-based compounds, active methylenes mercaptan-based compounds, acid amide-based compounds, acid imide-based compounds, imidazole-based compounds, urea-based compounds, oxime-based compounds, amine-based compounds, imine-based compounds, hydrogen sulfite salts, pyrazole-based compounds, and triazole-based compounds. These blocking agents may be used alone or in combination of at least two thereof. Further specific examples of the blocking agents include the following compounds (1) to (15).

(1) Alcohol-based compounds: alcohols such as methanol, ethanol, 2-propanol, n-butanol, sec-butanol, 2-ethyl-1-hexanol, 2-methoxyethanol, 2-ethoxyethanol, and 2-butoxyethanol.

(2) Alkylphenol-based compound: mono- or di-alkylphenols having, as a substituent, an alkyl group having a carbon number of at least 3.

Examples of the monoalkylphenols include n-propylphenol, iso-propylphenol, n-butylphenol, sec-butylphenol, tert-butylphenol, n-hexylphenol, 2-ethylhexylphenol, n-octylphenol, and n-nonylphenol.

Examples of the dialkylphenols include di-n-propylphenol, diisopropylphenol, isopropylcresol, di-n-butylphenol, di-t-butylphenol, di-sec-butylphenol, di-n-octylphenol, di-2-ethylhexylphenol, and di-n-nonylphenol.

(3) Phenol-based compounds: phenol, cresol, ethylphenol, styrenated phenol, and hydroxybenzoate.

(4) Active methylene-based compounds: dimethyl malonate, diethyl malonate, diisopropyl malonate, di-t-butyl malonate, methyl acetoacetate, ethyl acetoacetate, and acetylacetone.

(5) Mercaptan-based compounds: butyl mercaptan, and dodecylmercaptan.

(6) Acid amide-based compounds: acetanilide, acetamide, ε-caprolactam, S-valerolactam, and γ-butyrolactam.

(7) Acid imide-based compounds: succinimide, and maleinimide.

(8) Imidazole-based compounds: imidazole, and 2-methylimidazole.

(9) Urea-based compound: urea, thiourea, and ethylene urea.

(10) Oxime-based compound: formaldoxime, acetaldoxime, acetoxime, methylethylketoxime, and cyclohexanone oxime.

(11) Amine-based compound: diphenylamine, aniline, carbazole, di-n-propylamine, diisopropylamine, and isopropylethylamine.

(12) Imine-based compounds: ethylene imine, and polyethylene imine.

(13) Hydrogensulfite salts: sodium hydrogen sulfite.

(14) Pyrazole-based compounds: pyrazole, 3-methylpyrazole, and 3,5-dimethylpyrazole.

(15) Triazole-based compounds: 3,5-dimethyl-1,2,4-triazole.

Among these, the blocking agent is preferably at least one selected from the group consisting of the oxime-based compounds, the acid amide-based compounds, the amine-based compounds, the active methylene-based compounds and the pyrazole-based compounds is preferable from the viewpoint of easy availability, the viscosity of the resultant blocked isocyanate, the reaction temperature and the reaction time, an active methylene-based compound or a pyrazole-based compound is more preferable from the viewpoint of the curability at a low temperature, and a diethyl malonate or a 3,5-dimethylpyrazole is even more preferable.

(3-1) Method for Preparing Blocked Isocyanate

The blocking reaction of an isocyanate component and a blocking agent may be conducted in the presence or absence of a solvent. In the case where a solvent is used, a solvent inert against an isocyanate group is required to be used. An organic salt of metal such as tin, zinc or lead, a tertiary amine-based compound, or an alcoholate of alkali metal such as sodium may be used as a catalyst to conduct the blocking reaction. The reaction may be conducted generally at −20° C. to 150° C., and preferably 30° C. to 100° C. In the case where the temperature is the above-mentioned lower limit or more, the reaction speed tends to become fast. In the case where the temperature is the upper limit or less, the side-reaction tends to be prevented.

(3-2) Hydrophilic Isocyanate

The blocked isocyanate may be made to be a hydrophilic isocyanate in which a hydrophilic group is added by reacting a compound having both an active hydrogen-containing group and a hydrophilic group (hydrophilic group-containing compound) with an isocyanate group.

The hydrophilic group-containing compound that can be reacted with an isocyanate group is not particularly limited, examples thereof include compounds having nonionic, cationic, or anionic hydrophilic groups.

Compound Having Nonionic Hydrophilic Group

The compound used to introduce a nonionic hydrophilic group is not particularly limited, examples thereof include compounds in which an ethylene oxide is added to a hydroxyl group of an alcohol.

Examples of the alcohol include methanol, ethanol, butanol, ethylene glycol, and diethylene glycol. The compound used to introduce a nonionic hydrophilic group has an active hydrogen-containing group that reacts with an isocyanate group. Among these, the compound used to introduce a nonionic hydrophilic group is preferably a monoalcohol because the water-dispersibility of the blocked isocyanate can be improved at a small use amount thereof.

The number of added ethylene oxide is preferably 4 to 30 and more preferably 4 to 20. In the case where the number of added ethylene oxide is the lower limit or more, the hydrophilization tends to be easily ensured. In the case where the number of added ethylene oxide is the upper limit or less, the generation of deposits of the blocked isocyanate tends to be suppressed when stored at a low temperature.

Compound Having Cationic Hydrophilic Group

Examples of a method for introducing a cationic hydrophilic group include a method in which a compound having a cationic group and a functional group having a hydrogen having a reactivity with an isocyanate group is used, and a method in which a functional group such as a glycidyl group is added to an isocyanate group, followed by reacting the functional group with a specific compound such as sulfide or phosphine. Among these, the method in which a compound having a cationic group and a hydrogen having a reactivity with an isocyanate group is used is preferable because the method is easily conducted.

The functional group having a hydrogen having a reactivity with an isocyanate group is not particularly limited, and examples thereof include a hydroxyl group, and a thiol group.

The compound having a cationic hydrophilic group and a functional group having a hydrogen having a reactivity with an isocyanate group is not particularly limited, and examples thereof include dimethylethanolamine, diethylethanolamine, diethanolamine, methyl diethanolamine, N,N-dimethylaminohexanol, N,N-dimethylaminoethoxyethanol, N,N-dimethylaminoethoxyethoxyethanol, N,N,N'-trimethylaminoethylethanolamine, and N-methyl N-(dimethylaminopropyl)aminoethanol. In addition, the tertiary amino group (cationic hydrophilic group) introduced into an aqueous blocked isocyanate may be quaternized with dimethyl sulfate, diethyl sulfate, or the like.

Among these, the cationic hydrophilic group is preferably a tertiary amino group. In the case where the blocked isocyanate contains a tertiary amino group, a compound used to conduct neutralization, such as an anionic compound mentioned below, is easily vaporized by conducting heating, and thereby the water-resistance tends to be further improved.

The introduction of the cationic hydrophilic group may be conducted in the presence of a solvent. In the case, the solvent is preferably free from any functional groups having a reactivity with an isocyanate group. Although the solvent is not particularly limited, examples thereof include ethyl acetate, propylene glycol monomethyl ether acetate, and dipropylene glycol dimethyl ether.

The cationic hydrophilic group introduced into the blocked isocyanate is preferably neutralized with an anionic group-containing compound. Although an anionic group thereof is not particularly limited, examples thereof include a carboxyl group, a sulfonic acid group, a phosphoric acid group, a halogen group, and a sulfuric acid.

Although the compound having a carboxyl group is not particularly limited, examples thereof include formic acid, acetic acid, propionic acid, butyric acid, and lactic acid.

Although the compound having a sulfo group is not particularly limited, examples thereof include ethane sulfonate.

Although the compound having a phosphoric acid group is not particularly limited, examples thereof include phosphoric acid, and acidic phosphoric acid ester.

Although the compound having a halogen group is not particularly limited, examples thereof include hydrochloric acid.

Although the compound having a sulfuric acid group is not particularly limited, examples thereof include sulfuric acid.

Among these, a compound having one carboxyl group is preferable, and acetic acid, propionic acid, or butyric acid is more preferable, as the compound having an anionic group to be used to conduct neutralization of the cationic hydrophilic group.

Compound Having Anionic Hydrophilic Group

Although an anionic hydrophilic group is not particularly limited, examples thereof include a carboxylic acid group, a sulfonic acid group, a phosphoric acid group, a halogen group, and a sulfuric acid group.

A blocked polyisocyanate having an anionic hydrophilic group may be obtained, for example, by reacting an active hydrogen-containing group of a compound having both the active hydrogen-containing group that reacts with an isocyanate group and an anionic hydrophilic group with an isocyanate group of an isocyanate compound serving as a raw material.

Although the compound having both an active hydrogen-containing group and a carboxylic acid group is not particularly limited, examples thereof include: monohydroxy carboxylic acids; and polyhydroxy carboxylic acids.

Examples of the monohydroxy carboxylic acids include 1-hydroxyacetic acid, 3-hydroxypropanoic acid, 12-hydroxy-9-octadecanoic acid, hydroxypivalic acid, and lactic acid.

Examples of the polyhydroxy carboxylic acids include dimethylol acetic acid, 2,2-dimethylol butyric acid, 2,2-dimethylol pentanoic acid, dihydroxy succinic acid, and dimethylol propionic acid.

Among these, hydroxypivalic acid and dimethylol propionic acid are preferable as the compound having both an active hydrogen-containing group and a carboxylic acid group.

Although the compound having both an active hydrogen-containing group and a sulfonic acid group is not particularly limited, examples thereof include isethionic acid.

The anionic hydrophilic group introduced into the blocked isocyanate may be neutralized with an amine-based compound, which is a basic substance, without particular limitations. Although the amine-based compound is not particularly limited, examples thereof include ammonia and water-soluble amino compounds. Although the water-soluble amino compound is not particularly limited, examples thereof include: primary amines; secondary amines; and tertiary amines.

Examples of the primary amines and secondary amines include monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylene diamine, propylene diamine, methylethanolamine, dimethylethanolamine, diethylethanolamine, and morpholine.

Examples of the tertiary amine include triethylamine and dimethylethanolamine.

[Physical Property of Isocyanate Component]

(Viscosity)

The viscosity of the isocyanate component at 25° C. is preferably 1000 mPa·s or less, more preferably 500 mPa·s or less, even more preferably 400 mPa·s or less, and particularly preferably 170 mPa·s or less. In the case where the viscosity is the above-mentioned upper limit or less, the penetration property of the isocyanate component into the first uncured coating film tends to be further improved. The viscosity is preferably 100 mPa·s or more from the viewpoint of improvement of the coating film hardness. The viscosity can be measured using an E-type viscometer (manufactured by Tokimec, Inc.).

(Concentration of Difunctional Groups)

The concentration of an isocyanate compound having two isocyanate groups in a molecule thereof in the isocyanate component (concentration of difunctional groups) is preferably 10% by mass or less, and more preferably 0% by mass. In the case where the concentration is the above-mentioned upper limit or less, the coating film hardness tends to be further improved.

The concentration of difunctional groups can be determined by gel permeation chromatography (hereinafter, may be abbreviated as "GPC").

[Hydroxyl Group-Containing Resin Component]

The hydroxyl group-containing resin component contained in the first coating composition and the second coating composition preferably contains a compound having at least two hydroxyl groups (that is polyol). Examples of the polyol include polyester polyol, polyether polyol, acrylic polyol, polyolefin polyol, and fluorinated polyol. Among these, the polyol is preferably an acrylic polyol from the viewpoint of the weather resistance, the chemical resistance and the hardness, or a polyester polyol from the viewpoint of the mechanical strength and the oil resistance.

(Polyester Polyol)

A polyester polyol may be obtained by subjecting either a single dibasic acid or a mixture thereof and either a single polyvalent alcohol or a mixture thereof to condensation reaction, for example.

Examples of the dibasic acid include carboxylic acids such as succinic acid, adipic acid, dimeric acid, maleic anhydride, phthalic anhydride, isophthalic acid, terephthalic acid, and 1,4-cyclohexanedicarboxylic acid.

Examples of the polyvalent alcohol include ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylol propanediol, and ethoxylated trimethylolpropane.

Specific examples of the production method of the polyester polyol include a method in which the above-mentioned components are mixed and then heated at approximately 160° C. to 220° C. to conduct condensation reaction.

Other examples of the production method of polyester polyol include a method in which a lactone such as ε-caprolactone is subjected to ring-opening polymerization using a polyvalent alcohol to obtain a polycaprolactone to be used as a polyester polyol.

The polyester polyol may be denatured using an aromatic diisocyanate, an aliphatic diisocyanate, an alicyclic diisocyanate, or a polyisocyanate derived therefrom. In the case, an aliphatic diisocyanate, an alicyclic diisocyanate, or a polyisocyanate derived therefrom, is particularly preferable, from the viewpoint of the weather resistance and the yellowing resistance of the resultant coating film.

In the case of using as a water-based coating material, a part of carboxylic acid such as partially remained dibasic acid is remained to be neutralized with a base such as an amine or ammonia to obtain a water-soluble or water-dispersive resin.

(Polyether Polyol)

Examples of the polyether polyol include: polyether polyols obtained by conducting random or block addition of a single alkylene oxide or a mixture thereof to a single polyvalent hydroxy compound or a mixture thereof using a hydroxide, a strong basic catalyst, a composite metal cyanide complex, or the like; polyether polyols obtained by reacting a polyamine compound such as ethylene diamine with an alkylene oxide; and polymer polyols obtained by polymerizing acrylamides using the polyether polyol as a medium.

Examples of the hydroxide include lithium hydroxide, sodium hydroxide, and potassium hydroxide.

Examples of the strong basic catalyst include alcoholates and alkylamines.

Examples of the composite metal cyanide complex include metal porphyrins, and zinc hexacyanocobaltate complexes.

Examples of the alkylene oxide include ethylene oxide, propylene oxide, butylene oxide, cyclohexene oxide, and styrene oxide.

Examples of the polyvalent hydroxyl compound include diglycerine, ditrimethylolpropane, pentaerythritol, dipentaerythritol, sugar alcohol-based compounds, monosaccharides, disaccharides, trisaccharides, and tetrasaccharides.

Examples of the sugar alcohol-based compounds include erythritol. D-traitol, L-arabinitol, ribitol, xylitol, sorbitol, mannitol, galactitol, and ramnitol.

Examples of the monosaccharides include arabinose, ribose, xylose, glucose, mannose, galactose, fructose, sorbose, rhamnose, fucose, and ribodesose.

Examples of the disaccharides include trehalose, sucrose, maltose, cellobiose, gentiobiose, lactose, and melibiose.

Examples of the trisaccharides include raffinose, gentianose, and melicitose.

Examples of the tetrasaccharides include stachyose.

(Acrylic Polyol)

An acrylic polyol may be obtained by copolymerizing polymerizable monomers having at least one active hydrogen-containing group in a molecule thereof with other monomers copolymerizable with the polymerizable monomers.

Examples of the polymerizable monomers having at least one active hydrogen-containing group in a molecule thereof include: acrylic acid esters having an active hydrogen-containing group; methacrylic acid esters having an active hydrogen-containing group; (meth)acrylic acid esters having a polyvalent active hydrogen-containing group; monoethers of polyether polyols and the above-mentioned (meth)acrylic acid esters having an active hydrogen-containing group; adducts of glycidyl (meth)acrylate with a monobasic acid; and adducts obtained by subjecting lactones to ring-opening polymerization with active hydrogen-containing groups of the (meth)acrylic acid esters each having an active hydrogen-containing group mentioned above. These may be used alone or in combination of at least two thereof.

Examples of the acrylic acid esters having an active hydrogen-containing group include 2-hydroxyethyl acrylate, 2-hydroxypropyl acrylate, and 2-hydroxybutyl acrylate.

Examples of the methacrylic acid esters having an active hydrogen-containing group include 2-hydroxyethyl methacrylate, 2-hydroxypropyl methacrylate, 2-hydroxybutyl methacrylate, 3-hydroxypropyl methacrylate, and 4-hydroxybutyl methacrylate.

Examples of (meth)acrylic acid esters having a polyvalent active hydrogen-containing group include (meth)acrylic acid monoesters of triols such as glycerin or trimethylolpropane.

Examples of the polyether polyols include polyethylene glycol, polypropylene glycol, and polybutylene glycol.

Examples of the monobasic acid include an acetic acid, a propionic acid, and a p-tert-butyl benzoate.

Examples of the lactones include F-caprolactam, and γ-valerolactone.

Examples of the other monomers copolymerizable with the polymerizable monomers include: (meth)acrylic acid esters; unsaturated carboxylic acids; unsaturated amides; hydrolysable silyl group-containing vinyl monomers, and other polymerizable monomers. These may be used alone or in combination of at least two thereof.

Examples of the (meth)acrylic acid esters include methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate.

Examples of the unsaturated carboxylic acids include acrylic acid, methacrylic acid, maleic acid, and itaconic acid.

Examples of the unsaturated amides include acrylamide, N-methylol acrylamide, and diacetone acrylamide.

Examples of the vinyl monomers having a hydrolysable silyl group include vinyl trimethoxysilane, vinyl methyldimethoxysilane, and γ-(meth)acryloxypropyltrimethoxysilane Examples of the other polymerizable monomers include styrene, vinyl toluene, vinyl acetate, acrylonitrile, and dibutyl fumarate.

For example, the above-mentioned monomeric components are subjected to solution polymerization in the presence of a radical polymerization initiator, such as a conventionally-known peroxide or azo compound, followed by diluting the resultant with an organic solvent or the like, as needed, to obtain an acrylic polyol.

In the case where a water-based acrylic polyol is obtained, an olefinic unsaturated compound is subjected to solution polymerization to convert the resultant to an aqueous layer, or emulsion polymerization. In the case, an acidic moiety of a monomer containing a carboxylic acid such as an acrylic acid or a methacrylic acid or a monomer containing a sulfonic acid may be neutralized with an amine or ammonia to impart water solubility or water dispersibility to an acrylic polyol.

(Polyolefin Polyol)

Examples of polyolefin polyols include polybutadienes having at least two hydroxyl groups, hydrogenated polybutadienes having at least two hydroxyl groups, polyisoprenes having at least two hydroxyl groups, and hydrogenated polyisoprenes having at least two hydroxyl groups.

(Fluorinated Polyol)

The term "fluorinated polyol" means a polyol containing fluorine in a molecule thereof, and examples thereof include: fluoroolefins such as those disclosed in Japanese Unexamined Patent Application Publication No. Sho 57-34107 (Reference Document 5) and Japanese Unexamined Patent Application Publication No. Sho 61-275311 (Reference Document 6); and copolymers of cyclovinyl ethers, hydroxyalkylvinyl ethers, or vinyl monocarboxylates.

[Hydroxyl Value and Acid Value of Polyol]

The lower limit of the hydroxyl value of the polyol is not particularly limited, and is preferably 10 mgKOH/g, more preferably 20 mgKOH/g, and even more preferably 30 mgKOH/g.

In contrast, the upper limit of the hydroxyl value of the polyol is preferably 200 mgKOH/g.

That is, the hydroxyl value of the polyol is preferably 10 mgKOH/g to 200 mgKOH/g, more preferably 20 mgKOH/g to 200 mgKOH/g, and even more preferably 30 mgKOH/g to 200 mgKOH/g.

The acid value of the polyol is preferably 0 mgKOH/g to 30 mgKOH/g.

The hydroxyl value and the acid value may be determined in accordance with JIS K1557.

[NCO/OH]

In the second coating composition, the lower limit of the molar ratio (NCO/OH) of an isocyanate (NCO) group in the isocyanate component, relative to a hydroxyl (OH) group in the hydroxyl group-containing resin component, is preferably 1.0, more preferably 1.2, and even more preferably 1.3, from the viewpoint of the curability of the second coating composition, the penetration property of the isocyanate component into the first uncured coating film, and the resultant coating film hardness.

In contrast, in the second coating composition, the upper limit of NCO/OH is preferably 5.0, more preferably 3.0, and even more preferably 2.0, from the viewpoint of the cross-linkability of the coating film at the drying initial stage and the coating film hardness.

That is, in the second coating composition, the NCO/OH is preferably 1.0 to 5.0, more preferably 1.2 to 3.0, and even more preferably 1.3 to 2.0.

In the case where the first coating composition contains an isocyanate component, the NCO/OH in the first coating composition is preferably 1.0 or less, and more preferably less than 1.0. In the case where the NCO/OH is the above-mentioned upper limit or less, the isocyanate component of the second coating composition tends to be favorably penetrated into the first coating composition (first uncured coating film), and the first coating composition can be efficiently cured.

[Other Components]

The first coating composition and the second coating composition may further contain other components in addition to the above-mentioned isocyanate component and the hydroxyl group-containing resin component.

Examples of the other components include unsaturated bond-containing compounds, inert compounds, metal atoms, basic amino compounds, carbon dioxide, and halogen atoms. At least one of these components may be contained alone or at least two thereof may be contained in combination.

In the first coating composition and the second coating composition, the lower limit of the content of the other component, relative to the content of the triisocyanate (I), may be 1.0 ppm by mass, 3.0 ppm by mass, 5.0 ppm by mass, or 10 ppm by mass.

In contrast, the upper limit of the content of the other component, relative to the content of the triisocyanate (I), may be $1.0 \times 10^4$ ppm by mass, $5.0 \times 10^3$ ppm by mass, $3.0 \times 10^3$ ppm by mass, or $1.0 \times 10^3$ ppm by mass.

That is, the content of the other components in the first coating composition and the second coating composition, relative to the content of the triisocyanate (I), may be 1.0 ppm by mass to $1.0 \times 10^4$ ppm by mass, 3.0 ppm by mass to $5.0 \times 10^3$ ppm by mass, 5.0 ppm by mass to $3.0 \times 10^3$ ppm by mass, or 10 ppm by mass to $1.0 \times 10^3$ ppm by mass, from the viewpoint of coloring-preventability and stability-improvement when stored for a long term.

(Unsaturated Bond-Containing Compound)

Examples of the unsaturated bond-containing compound include compounds having an unsaturated bond between carbons, an unsaturated bond between carbon and nitrogen, or an unsaturated bond between carbon and oxygen. The unsaturated bond is preferably a double bond, and more preferably a double bond between carbons (C=C) or between carbon and oxygen (C=O), from the viewpoint of compound-stability. A carbon atom constituting the compound may be a carbon atom bonding with three atoms.

Although the double bond between carbons may be generally a double bond between carbons constituting an aromatic ring, the unsaturated bond contained in the unsaturated bond-containing compound contained in the resin composition according to the present embodiment does not contain a double bond between carbons constituting an aromatic ring.

Examples of the compound having a double bond between carbon and oxygen include carbonic acid derivatives. Examples of the carbonic acid derivatives include urea compounds, carbonic acid esters, N-unsubstituted carbamic acid esters, and N-substituted carbamic acid esters.

(Inert Compound)

The inert compounds are classified into the following compounds A to G, for example.

Specifically, hydrocarbon compounds are classified into the compounds A and B, ether compounds and sulfide compounds are classified into the compounds C to E, halogenated hydrocarbon compounds are classified into the compound F. and silicon-containing hydrocarbon compounds, silicon-containing ether compounds and silicon-containing sulfide compounds are classified into the compound G. The compounds A to G do not contain any unsaturated bonds other than aromatic rings, and the above-mentioned unsaturated bond-containing compounds do not belong thereto.

Compound A: Linear, branched or cyclic aliphatic hydrocarbon.

Compound B: Aromatic hydrocarbon compound which may be substituted with an aliphatic hydrocarbon group.

Compound C: Compound having either an ether structure or a sulfide group and aliphatic hydrocarbon groups, in which the same kind or different kind of aliphatic hydrocarbon compounds are bonded together through the ether structure or the sulfide group.

Compound D: Compound having either an ether structure or a sulfide group and aromatic hydrocarbon groups, in which the same kind or different kind of aromatic hydrocarbon groups are bonded together through the ether structure or the sulfide group.

Compound E: Compound having either an ether structure or a sulfide group, and both an aliphatic hydrocarbon group and an aromatic hydrocarbon group.

Compound F: Halide in which at least one hydrogen atom constituting an aliphatic hydrocarbon compound, or at least one hydrogen atom constituting an aromatic hydrocarbon compound is substituted with a halogen atom.

Compound G: Compound in which a part or a whole of carbon atoms of the compounds A to E is substituted with silicon atoms.

(Metal Atom)

The metal atom may be present as a metal ion, or as a metallic element. The metal atom may be one kind of metal atom or in combination of a plurality of kinds of metal atoms. The metal atom is preferably a divalent to tetravalent metal atom, and, among these, at least one kind of metal selected from the group consisting of iron, cobalt, nickel, zinc, tin, copper, and titanium is more preferable.

(Basic Amino Compound)

The basic amino compound is an ammonia derivative such as a compound (primary) in which one hydrogen atom is substituted with an alkyl group or an aryl group; a compound (secondary) in which two hydrogen atoms are substituted therewith; or a compound (tertiary) in which three hydrogen atoms are substituted therewith. Among these, the basic amino compound is preferably a secondary or tertiary amino compound, and more preferably an aliphatic amine, an aromatic amine, a heterocyclic amine, or a basic amino acid.

(Carbon Dioxide) The carbon dioxide may be dissolved in isocyanate under an ordinary pressure or under an increased pressure realized in a pressure vessel. The moisture amount in the carbon dioxide is preferably controlled, as needed, because there is a case where the use of carbon dioxide containing moisture causes hydrolysis of isocyanate.

(Halogen Atom)

The amount of halogen atoms in the first coating composition and the second coating composition is preferably $1.0 \times 10^2$ ppm by mass or less from the viewpoint of prevention of coloring. Although the halogen atom is not particularly limited, the halogen atom is preferably at least one selected from the group consisting of chlorine atom and bromine atom, and more preferably at least one ion or compound selected from the group consisting of chlorine ion, bromine ion, hydrolysable chlorine and hydrolysable bromine. Examples of the hydrolysable chlorine include a carbamoyl chloride compound in which a hydrogen chloride is added to an isocyanate group, and examples of the hydrolysable bromine include a carbamoyl bromide compound in which a hydrogen bromide is added to an isocyanate group.

[Melamine-Based Curing Agent]

The first coating composition and the second coating composition may further contain a melamine-based curing agent, as needed. Examples of the melamine-based curing agent include perfect alkyl type, a methylol type alkyl, or imino group type alkyl.

[Organic Solvent]

The isocyanate component, the hydroxyl group-containing resin component, the first coating composition and the second coating composition may be mixed with an organic solvent to be used. It is preferable that the organic solvent do not have a functional group that reacts with a hydroxyl group and an isocyanate group. In addition, it is preferable that the organic solvent be compatible with an isocyanate component. Examples of the organic solvent include solvents generally used as coating solvents, and specific examples thereof include ester compounds such as butyl acetate, ether compounds, ketone compounds, aromatic compounds, ethylene glycol dialkyl ether-based compounds, polyethylene glycol dicarboxylate-based compounds, hydrocarbon-based solvents, and aromatic solvents such as xylene.

[Other Additives]

The first coating composition and the second coating composition may further contain various additives used in the art, such as a curing promoting catalyst, a pigment, a leveling agent, an antioxidant, an ultraviolet absorber, a photostabilizer, a plasticizer, or a surfactant, depending on the object or the application purpose thereof, within the range not impairing the desired effects of the present embodiment.

Examples of the curing promoting catalyst include metal salts and tertiary amines.

Examples of the metal salts include dibutyltin dilaurate, tin 2-ethylhexanoate, zinc 2-ethylhexanoate, and cobalt salts.

Examples of the tertiary amines include triethylamine, pyridine, methylpyridine, benzyl dimethylamine, N,N-dimethylcyclohexylamine, N-methylpiperidine, pentamethyl diethylene triamine, N,N'-endoethylenepiperazine, and N,N'-dimethylpiperazine.

[Use]

The first coating composition and the second coating composition are useful as a primer or upper and intermediate coating material to be applied on a material such as metal (such as steel plate or surface-treated steel plate), plastic, wood, film, or inorganic material, for example. In addition, the first coating composition and the second coating composition are also useful as a coating material to be used to impart beautiful appearance, weather resistance acid resistance, rust resistance, chipping resistance, or the like, to precoat metal such as anti-rust steel plates, vehicle coating, or the like. Moreover, the first coating composition and the second coating composition are also useful as a urethane raw material of adhesives, tackifiers, elastomers, foams, surface-treating agents, or the like.

<Object to be Coated>

An object to be coated by the coating method according to the present embodiment is not particularly limited, and may be a coating film or a substrate. Examples of the substrate include metal (such as steel plate or surface-treated steel plate), plastic, wood, film, and inorganic material.

<<Coating Film>>

The coating film according to the second embodiment of the present invention may be formed by the coating method according to the first embodiment. The explanation of the same constitutions as those in the first embodiment will be omitted.

The coating film according to the present embodiment is formed specifically by coating the first coating composition on the surface of an object to be coated, such as a substrate or a coating film to obtain a first uncured coating film, coating the second coating composition on the first uncured coating film to obtain a second uncured coating film, and curing the first uncured coating film and the second uncured coating film simultaneously by conducting heating.

When the second uncured coating film is laminated on the first uncured coating film, the second coating composition is partially penetrated into the first uncured coating film and then the isocyanate component (a) containing the triisocyanate (I) is penetrated in the first uncured coating film from the second uncured coating film side thereof to the side of an object to be coated. Accordingly, the adhesiveness between the first uncured coating film and the second uncured coating film is improved.

In the case where the object to be coated is an uncured coating film, a precoat layer is formed by penetrating the first coating composition into the uncured coating film. The hydroxyl group-containing resin component is present in the precoat layer. Accordingly, the first uncured coating film is cured via the precoat layer while being attached further closely to the object to be coated. In addition, it is preferable that the isocyanate component (a) be present in the precoat layer by penetrating from the second uncured coating film through the first uncured coating film. The adhesiveness of the coating film can be further increased by curing the precoat layer, the first uncured coating film, and the second uncured coating film, simultaneously, in the presence of the isocyanate component (a).

It is preferable that the object to be coated, which is an uncured coating film, contain a polyol as the main agent, and further contain a melamine-based curing agent. The melamine-based curing agent is described in the first embodiment.

<<Coating Material Kit>>

The coating material kit according to the third embodiment of the present invention contains: a first coating composition put in a first container; and, a second coating composition put in a second container, in which the first coating composition contains a hydroxyl group-containing resin component, and the second coating composition contains: the isocyanate component (a) containing the above-mentioned triisocyanate (I); and the hydroxyl group-containing resin component. In the coating material kit, the isocyanate component (a) containing the triisocyanate (I) serves as a curing agent.

The first coating composition and the second coating composition have the same constitutions as those of the first embodiment, and the explanation thereof will be omitted.

The method for using the coating material kit according to the present embodiment are the same as that described in the second embodiment, and the explanation thereof will be omitted.

EXAMPLES

Hereinafter, the present embodiment will be described further specifically with reference to specific examples and comparative examples. However, the present embodiment is not limited to the following examples and comparative examples unless the present embodiment exceeds the gist thereof. The physical properties of isocyanate components and evaluation of coating films were conducted as shown below. The terms "part" and "%" indicate "part by mass" and "% by mass" respectively, unless particularly mentioned.

<Method for Measuring Physical Properties>

[Physical Property 1] Viscosity of Isocyanate Component

The viscosity of the isocyanate component was measured at 25° C. using an E-type viscometer (manufactured by Tokimec, Inc.). In the measurement, a standard rotor (1°34'× R24) was used. The number of rotation was described below.

(Number of Rotation)
100 rpm (at less than 128 mPa·s)
50 rpm (at 128 mPa·s or more but less than 256 mPa·s)
20 rpm (at 256 mPa·s or more but less than 640 mPa·s)
10 rpm (at 640 mPa·s or more but less than 1280 mPa·s)
5 rpm (at 1280 mPa·s or more but less than 2560 mPa·s)

[Physical Property 2] NCO Content of Isocyanate Component

Isocyanate groups in each isocyanate component were neutralized with an excess amount of 2N amine, followed by conducting back titration using 1N hydrochloric acid to determine the NCO content (% by mass) of the isocyanate component.

[Physical Property 3] Calculated NCO Content of Isocyanate Component

The NCO content of an isocyanate compound used to synthesize a blocked isocyanate was determined by the method described in the [physical property 2], and the mass of NCO was determined from the mass of the isocyanate compound charged. Then, the calculated NCO content was determined using the following formula.

$$\text{Calculated NCO content (\% by mass)} = 100 \times \text{the mass of NCO/the total mass of the isocyanate compound charged}$$

[Physical Property 4] Number-Average Molecular Weight (Mn) of Isocyanate Component The number-average molecular weight (Mn) of an isocyanate component was determined based on polystyrene by conducting gel permeation chromatography (hereinafter, may be referred to as "GPC") measurement using the following device and conditions.

(Measurement Conditions)
Device: "HLC-8120 GPC" (trade name) manufactured by Tosoh Corporation
Column used: Manufactured by Tosoh Corporation
"TSK gel Super H1000" (trade name)×1 column.
"TSK gel Super H2000" (trade name)×1 column,
"TSK GEL Super H3000" (trade name)×1 column.
Carrier: Tetrahydrofuran
Detection method: Differential refractometer
Sample concentration: 5 mass/% by volume
Outflow: 0.6 mL/min,
Column temperature: 40° C.

[Physical Property 5] Average Number of Isocyanate Groups (Fn) in Isocyanate Component The average number of isocyanate groups (Fn) in an isocyanate component was determined by the following formula.

$$\text{Average number of isocyanate groups (Fn)} = [\text{Number-average molecular weight (Mn)} \times \text{NCO content (\% by mass)} \times 0.01]/42$$

[Physical Property 6] Concentration of Difunctional Groups (Difunctional Group Content) in Isocyanate Component The concentration of difunctional groups in an isocyanate component was determined by conducting GPC measurement using the same device and conditions as those used to measure the number-average molecular weight, followed by calculating the ratio (%) of the area of diisocyanate monomers and diisocyanate dimers, relative to the total area of the isocyanate component.

<Evaluation Method>

[Evaluation 1] Coating Film Hardness

The Koenig hardness of a sample coating plate obtained in each Examples and Comparative Examples was measured at 23° C. using a Koenig hardness tester (manufactured by BYK). As the evaluation criteria, 28 times or more were evaluated as ⊚+, 24 times to 27 times were evaluated as ⊚, 20 times to 23 times were evaluated as ○, 15 times to 19 times were evaluated as Δ, and 14 times or less were evaluated as ×.

[Evaluation 2] Penetration Property into Lower Layer

The cross section of multilayered coating films of a sample coating plate obtained in each Examples and Comparative Examples was processed by broad ion beam. The sample coating plate was cooled until immediately before conducting processing so as to suppress thermal damage when processing was conducted. Specifically, the sample coating plate was left still for 12 hours in a cooling device at −20° C. Thus, a smooth coating film cross section was obtained.

The resultant was subjected to endoscopic IR measurement at the vicinity of the adhered surface between the resultant coating film and the substrate to obtain values A and B of the peak absorbance at 1730±50 cm$^{-1}$ and 2960±50 cm$^{-1}$, respectively, and then the ratio A/B was evaluated in accordance with the following criteria: the penetration property into lower layer was evaluated as ⊚ when the ratio A/B was 5.5 or more; the penetration property into lower layer was evaluated as ○ when the ratio A/B was 5.2 or more but less than 5.5; the penetration property into lower layer was evaluated as Δ when the ratio A/B was 4.9 or more but less than 5.2; and the penetration property into lower layer was evaluated as x when the ratio A/B was less than 4.9.

[Evaluation 3] Adhesiveness

A sample coating plate obtained in each Examples and Comparative Examples was soaked in water at 23° C., and, after 1 day passed, the adhesiveness test was conducted in accordance with JTS K5600-5-6. The results were evaluated in accordance with the following evaluation criteria: the peeling number of 0 was evaluated as ⊚ the peeling number of 1 or more but less than 10 was evaluated as ○; the peeling number of 10 or more but less than 50 was evaluated as Δ; and the peeling number of 50 or more but 100 or less was evaluated as x.

[Evaluation 4] Yellowing Property when Baked

A white tile plate was used as a substrate instead of JIS G 3141 (SPCC, SD) cationic electrodeposition coated plate used in each Examples and Comparative examples to obtain b value of a sample coating plate obtained in each Examples and Comparative Examples using a color-difference meter (manufactured by KONICA MINOLTA OPTICS, INC., color-difference meter "CR-231"). The yellowing property when baked was evaluated using the resultant b value in accordance with the following evaluation criteria: the yellowing property was evaluated as ○ when the b value was 0.0; and the yellowing property was evaluated as x when the b value was 0.1 or more.

[Synthesis Example 1] Synthesis of GTI 275 g of glutamic acid hydrochloride, 800 g of ethanolamine hydrochloride, and 150 ml of toluene were put into a four-necked flask equipped with a stirrer, a thermometer, and a gas inlet tube, and then the mixture was heated to reflux at 110° C. for 24 hours while blowing a hydrogen chloride gas thereinto until azeotropy of water was not confirmed. The resultant reaction mixture was recrystallized in a mixture liquid composed of methanol and ethanol to obtain 270 g of bis(2-aminoethyl)glutamate trihydrochloride. 85 g of the bis(2-aminoethyl)glutamate trihydrochloride was suspended in 680 g of o-dichlorobenzene, and then the temperature of the reaction liquid was raised while conducting stirring. When the temperature thereof reached 135° C., a phosgene was blown thereinto at a rate of 0.8 mol/hour for 13 hours. The resultant was subjected to filtration, condensation under reduced pressure, and then purification with a thin-film evaporator to obtain 54 g of GTI. The viscosity of the GTI was 200 mPa·s/25° C., the NCO content thereof was 40% by mass, the average number of isocyanate groups was 3.0, and the concentration of difunctional groups was 0%.

[Synthesis Example 2] Synthesis of LTI 122.2 g of ethanolamine, 100 nil of o-dichlorobenzene, and 420 ml of toluene were put into a four-necked flask equipped with a stirrer, a thermometer, and a gas inlet tube, and then hydrogen chloride gas was introduced therein under ice-cooling to convert the ethanolamine into a hydrochloride. Then, 182.5 g of lysine hydrochloride was added to the resultant, and then the reaction liquid was heated at 80° C. to dissolve the ethanolamine hydrochloride therein, followed by introducing a hydrogen chloride gas thereinto to obtain lysine dihydrochloride. In addition, a hydrogen chloride gas was passed therethrough at a rate of 20 ml/minute to 30 ml/minute, and the reaction liquid was heated at 116° C. until water was not distilled off. The resultant reaction mixture was recrystallized in a mixture liquid composed of methanol and ethanol to obtain 165 g of a lysine β-aminoethyl ester trihydrochloride. 100 g of the lysine β-aminoethyl ester trihydrochloride was pulverized to fine powders, and then suspended in 1200 ml of o-dichlorobenzene, followed by heating the reaction liquid while conducting stirring. When the temperature thereof reached 120° C., phosgene was blown into the reaction liquid at a rate of 0.4 mol/hour for 10 hours, followed by heating the reaction liquid to 150° C. The suspension was almost dissolved. After the resultant was cooled and then subjected to filtration, the dissolved phosgene and solvent were distilled off under the reduced pressure, and then the resultant was subjected to vacuum distillation to obtain 80.4 g of a colorless and transparent LTI having a boiling point of 155° C./0.022 mmHg to 157° C./0.022 mmHg. The viscosity of the LTI was 26 mPa·s/25° C., the NCO content was 47% by mass, the average number of isocyanate groups was 3.0, and the concentration of difunctional groups was 0%.

[Synthesis Example 3] Synthesis of NTI 1060 g of 4-aminomethyl-1,8-octamethylene diamine (hereinafter, may be referred to as "triamine") was dissolved in 1500 g of methanol in a four-necked flask equipped with a stirrer, a thermometer, and a gas inlet tube, and then 1800 ml of 35% concentrated hydrochloric acid was added dropwise into the resultant solution gradually while conducting cooling. The resultant was concentrated by removing methanol and water therefrom under reduced pressure, and then dried at 60° C./5 mmHg for 24 hours to obtain a white solid triamine hydrochloride. 650 g of the resultant triamine hydrochloride was pulverized to fine powders, and then suspended in 5000 g of o-dichlorobenzene, followed by raising the temperature of the reaction liquid while conducting stirring. When the temperature reached 100° C., a phosgene was blown thereinto at a rate of 200 g/Hr, and risig temperature was kept until the temperature reached 180° C., followed by maintaining the temperature at 180° C. while blowing the phosgene thereinto for 12 hours. The dissolved phosgene and solvent were distilled off under reduced pressure, followed by conducting vacuum distillation to obtain 420 g of a colorless and transparent NTI having a boiling point of 161° C./1.2 mmHg to 163° C./1.2 mmHg. The viscosity of the NTI was 10 mPa·s/25° C., the NCO content was 50% by mass, the average number of isocyanate groups was 3.0, and the concentration of difunctional groups was 0%.

[Synthesis Example 4] Synthesis of Polyisocyanate P-1

50 g of LTI and 0.05 g of isobutabol were charged in a four-necked flask equipped with a stirrer, a thermometer, a reflux condenser, and a nitrogen inlet tube under nitrogen atmosphere, and then the temperature thereof was maintained at 80° C. for 2 hours. Then, tetramethyl ammonium caprate was added thereto to allow the reaction to proceed, and then, when the NCO content became 37% by mass, dibutyl phosphate was added thereto to terminate the reaction. Then, the reaction liquid was maintained at 120° C. for 15 minutes to obtain a polyisocyanate P-1. The viscosity of the polyisocyanate P-1 was 400 mPa·s/25° C., the NCO content was 37% by mass, the average number of isocyanate groups was 6.2, and the concentration of difunctional groups was 0%.

[Synthesis Example 5] Synthesis of Polyisocyanate P-2

50 g of HDI was put in a four-necked flask equipped with a stirrer, a thermometer, a reflux condenser, and a nitrogen inlet tube under nitrogen atmosphere, and the temperature in the reactor was maintained at 80° C. while conducting stirring. Tetramethyl ammonium caprate was added thereto to allow the reaction to proceed, and, when the yield became 40%, dibutyl phosphate was added thereto to terminate the reaction. Then, the resultant was maintained at 120° C. for 15 minutes to obtain a polyisocyanate P-2. The viscosity of the polyisocyanate P-2 was 5 mPa·s/25° C., the NCO content was 43% by mass, the average number of isocyanate groups was 2.5, and the concentration of difunctional groups was 60%.

[Synthesis Example 6] Synthesis of Polyisocyanate P-3

Unreacted HDI was removed from the polyisocyanate P-2 obtained in the synthesis example 5 using a thin-film evaporator to obtain a polyisocyanate P-3. The viscosity of the polyisocyanate P-3 was 2300 mPa·s/25° C., the NCO content was 21.5% by mass, the average number of isocyanate groups was 3.3, and the concentration of difunctional groups was 0%.

[Synthesis Example 7] Synthesis of Polyisocyanate P-4

50 g of HDI was put in a four-necked flask equipped with a stirrer, a thermometer, a reflux condenser, and a nitrogen inlet tube under nitrogen atmosphere, and the temperature in the reactor was maintained at 60° C. while conducting stirring. 0.5 g of trisdiethylaminophosphine was added thereto to allow the reaction to proceed. After 4 hours passed, 0.4 g of phosphoric acid was added to the resultant and then the resultant was maintained at 60° C. for 1 hour to confirm that the reaction was terminated and the reaction was obtained. After the reaction liquid was subjected to filtration, unreacted HDI was removed using a thin-film evaporator to obtain a polyisocyanate P-4. The viscosity of the polyisocyanate P-4 was 52 mPa·s/25° C., the NCO content was 24% by mass, the average number of isocyanate groups was 2.1, and the concentration of difunctional groups was 76%.

[Synthesis Example 8] Synthesis of Polyisocyanate P-5

50 g of HDI, 10.7 g of trimethyl phosphate, 10.7 g of methyl cellosolve, and 0.25 g of water were put in a four-necked flask equipped with a stirrer, a thermometer, a reflux condenser, and a nitrogen inlet tube under nitrogen atmosphere. Then, the temperature in the reactor was maintained at 120° C. for 2 hours, and then further maintained at 160° C. for 4 hours to allow the reaction to proceed, while conducting stirring. Then, the resultant was cooled to room temperature to obtain a reaction liquid. After the reaction liquid was subjected to filtration, and then unreacted HDI was removed using a thin-film evaporator to obtain a polyisocyanate P-5. The viscosity of the polyisocyanate P-5 was 1100 mPa·s/25° C., the NCO content was 24% by mass, the average number of isocyanate groups was 3.0, and the concentration of difunctional groups was 13%.

Example 1

Acrylic polyol (manufactured by DIC Corporation under the trade name of "ACRYDIC A-801") diluted with butyl acetate/xylene (mass ratio 1/1) such that the resin solid content became 18% by mass was applied as a first coating composition on a JIS G 3141 (SPCC, SD) cationic electrodeposition coated plate used as a substrate such that the dried coating film thickness became 20 μm, and then preheated at 80° C. for 3 minutes. After conducting preheating, a second coating composition obtained by blending acrylic polyol (manufactured by Allnex Ltd., under the trade name of "SETALUX 1767") and LTI at a molar ratio, isocyanate group/hydroxyl group (NCO/OH), of 1.5, and then diluting the mixture with butyl acetate such that the resin solid content become 50% by mass was applied thereon such that the dried coating film thickness became 35 μm. Thereafter, the resultant was heated at 80° C. for 30 minutes to obtain a sample coating plate on which multilayered coating films are coated. The resultant sample coating plate was evaluated by the above-mentioned method in terms of the coating film hardness, the penetration property into lower layer and the adhesiveness. As the result, the coating film hardness was evaluated as ○, the penetration property into lower layer was evaluated as ◎, and the adhesiveness was evaluated as ◎. The results are also shown in Table 1.

Examples 2 to 13 and Comparative Examples 1 to 4

The sample coating plate was obtained by the same method as that of Example 1 except that the kind of the isocyanate component, and the blend ratio of the isocyanate component and the hydrogen group-containing resin component are shown in Table 1. Each of the resultant sample coating plate was evaluated by the same method as that mentioned above in terms of the coating film hardness, the penetration property into lower layer and the adhesiveness. The results are shown in Table 1.

Two kinds of isocyanate components were used in Examples 10 to 13. In Example 10, isocyanate components in which NTI and P-3 were blended at a mass ratio. NTI/P-3, of 5/5 was used. In Example 11, isocyanate components in which NTI and P-3 were blended at a mass ratio, NTI/P-3, of 3/7 was used. In Example 12, isocyanate components in which NTI and P-3 were blended at a mass ratio, NTI/P-3, of 4/6 was used. In Example 13, isocyanate components in which NTI and P-3 were blended at a mass ratio, NTI/P-3, of 9/1 was used.

Example 14

An acrylic polyol dispersion (manufactured by Allnex Ltd., under the trade name of "SETAQUA 6520") was applied on a JIS G 3141 (SPCC, SD) cationic electrodeposition coated plate used as a substrate such that the dried coating film thickness became 35 μm. Thereafter, an acrylic polyol emulsion (manufactured by Allnex Ltd., under the trade name of "SETAQUA 6515") diluted with deionized water such that the resin solid content became 20% by mass was applied thereon as a first coating composition such that the dried coating film thickness became 20 μm. Thereafter, the resultant was preheated at 80° C. for 3 minutes. After conducting preheating, a second coating composition obtained by blending acrylic polyol (manufactured by Allnex Ltd., under the trade name of "SETALUX 1767") and LTI at a molar ratio, isocyanate group/hydroxyl group (NCO/OH), of 1.5, and then diluting the mixture with butyl acetate such that the resin solid content become 50% by mass was applied thereon such that the dried coating film thickness became 35 µm. Thereafter, the resultant was heated at 80° C. for 30 minutes to obtain a sample coating plate on which multilayered coating films are coated. The resultant sample coating plate was evaluated by the above-mentioned method in terms of the coating film hardness, the penetration property into lower layer and the adhesiveness. As the result, the coating film hardness was evaluated as ○, the penetration property into lower layer was evaluated as ◎, and the adhesiveness was evaluated as ◎. The results are also shown in Table 2.

Examples 15 to 26 and Comparative Examples 5 to 8

The sample coating plate was obtained by the same method as that of Example 14 except that the kind of the isocyanate component, and the blend ratio of the isocyanate component and the hydrogen group-containing resin component are shown in Table 2. Each of the resultant sample coating plate was evaluated by the same method as that mentioned above in terms of the coating film hardness, the penetration property into lower layer and the adhesiveness. The results are shown in Table 2.

Two kinds of isocyanate components were used in Examples 23 to 26. In Example 23, isocyanate components in which NTI and P-3 were blended at a mass ratio, NTI/P-3, of 5/5 was used. In Example 24, isocyanate components in which NTI and P-3 were blended at a mass ratio, NTI/P-3, of 3/7 was used. In Example 25, isocyanate components in which NTI and P-3 were blended at a mass ratio, NTI/P-3, of 4/6 was used. In Example 26, isocyanate components in which NTI and P-3 were blended at a mass ratio, NTI/P-3, of 9/1 was used.

Examples 27 to 32

The sample coating plate was obtained by the same method as that of Example 14 except that the kind of the isocyanate component, and the heating temperature are shown in Table 3. Each of the resultant sample coating plate was evaluated by the same method as that mentioned above in terms of the coating film hardness, the penetration property into lower layer, the adhesiveness, and the yellowing property when baked. The results are shown in Table 3.

TABLE 1

| | | Ex. 1 | Ex. 2 | Ex. 3 | Ex. 4 | Ex. 5 | Ex. 6 |
|---|---|---|---|---|---|---|---|
| Isocyanate | LTI | ○ | — | — | ○ | ○ | ○ |
| | GTI | — | ○ | — | — | — | — |
| | NTI | — | — | ○ | — | — | — |
| | P-1 | — | — | — | — | — | — |
| | P-2 | — | — | — | — | — | — |
| | P-3 | — | — | — | — | — | — |
| | P-4 | — | — | — | — | — | — |
| | P-5 | — | — | — | — | — | — |

TABLE 1-continued

| | Ex. 1 | Ex. 2 | Ex. 3 | Ex. 4 | Ex. 5 | Ex. 6 |
|---|---|---|---|---|---|---|
| Viscosity [mPa · s] | 26 | 200 | 10 | 26 | 26 | 26 |
| NCO content [%] | 47 | 40 | 50 | 47 | 47 | 47 |
| NCO group number [number] | 3.0 | 3.0 | 3.0 | 3.0 | 3.0 | 3.0 |
| Difunctional group content [%] | 0 | 0 | 0 | 0 | 0 | 0 |
| Ratio NCO/OH | 1.5 | 1.5 | 1.5 | 1.1 | 2.2 | 4.2 |
| Coating film hardness | ○ | ○ | ○ | ○ | Δ | Δ |
| Penetration property into lower layer | ◎ | ○ | ◎ | ○ | ◎ | ◎ |
| Adhesiveness | ◎ | ◎ | ◎ | ○ | ◎ | ◎ |

| | | Ex. 7 | Ex. 8 | Ex. 9 | Ex. 10 | Ex. 11 | Ex. 12 |
|---|---|---|---|---|---|---|---|
| Isocyanate | LTI | — | — | — | — | — | — |
| | GTI | — | — | — | — | — | — |
| | NTI | ○ | ○ | — | ○5 | ○3 | ○4 |
| | P-1 | — | — | ○ | — | — | — |
| | P-2 | — | — | — | — | — | — |
| | P-3 | — | — | — | ○5 | ○7 | ○6 |
| | P-4 | — | — | — | — | — | — |
| | P-5 | — | — | — | — | — | — |
| Viscosity [mPa · s] | | 10 | 10 | 400 | 150 | 200 | 170 |
| NCO content [%] | | 50 | 50 | 37 | 36 | 30 | 33 |
| NCO group number [number] | | 3.0 | 3.0 | 6.2 | 3.2 | 3.2 | 3.2 |
| Difunctional group content [%] | | 0 | 0 | 0 | 0 | 0 | 0 |
| Ratio NCO/OH | | 1.1 | 2.2 | 1.5 | 1.5 | 1.5 | 1.5 |
| Coating film hardness | | ○ | ○ | ○ | ◎+ | Δ | ◎ |
| Penetration property into lower layer | | ○ | ◎ | ○ | ◎ | ◎ | ◎ |
| Adhesiveness | | ○ | ◎ | ◎ | ◎ | ◎ | ◎ |

| | | Ex. 13 | C. Ex. 1 | C. Ex. 2 | C. Ex. 3 | C. Ex. 4 |
|---|---|---|---|---|---|---|
| Isocyanate | LTI | — | — | — | — | — |
| | GTI | — | — | — | — | — |
| | NTI | ○9 | — | — | — | — |
| | P-1 | — | — | — | — | — |
| | P-2 | — | ○ | — | — | — |
| | P-3 | ○1 | — | — | — | ○ |
| | P-4 | — | — | — | ○ | — |
| | P-5 | — | — | ○ | — | — |
| Viscosity [mPa · s] | | 20 | 52 | 1100 | 5 | 2300 |
| NCO content [%] | | 47 | 24 | 24 | 43 | 21.5 |
| NCO group number [number] | | 3.0 | 2.1 | 3.0 | 2.5 | 3.3 |
| Difunctional group content [%] | | 0 | 76 | 13 | 60 | 0 |
| Ratio NCO/OH | | 1.5 | 1.5 | 1.5 | 1.5 | 1.5 |
| Coating film hardness | | ◎ | X | Δ | X | Δ |
| Penetration property into lower layer | | ◎ | ◎ | X | ○ | X |
| Adhesiveness | | ◎ | Δ | X | X | X |

(Ex.: Example; C. Ex.: Comparative Example)

TABLE 2

| | | Ex. 14 | Ex. 15 | Ex. 16 | Ex. 17 | Ex. 18 | Ex. 19 |
|---|---|---|---|---|---|---|---|
| Isocyanate | LTI | ○ | — | — | ○ | ○ | ○ |
| | GTI | — | ○ | — | — | — | — |
| | NTI | — | — | ○ | — | — | — |
| | P-1 | — | — | — | — | — | — |
| | P-2 | — | — | — | — | — | — |
| | P-3 | — | — | — | — | — | — |
| | P-4 | — | — | — | — | — | — |
| | P-5 | — | — | — | — | — | — |

TABLE 2-continued

| | | | | | | |
|---|---|---|---|---|---|---|
| Ratio NCO/OH | 1.5 | 1.5 | 1.5 | 1.1 | 2.2 | 4.2 |
| Coating film hardness | ○ | ○ | ○ | ○ | △ | △ |
| Penetration property into lower layer | ◎ | △ | ◎ | △ | ◎ | ◎ |
| Adhesiveness | ◎ | ○ | ◎ | △ | ◎ | ◎ |

| | | Ex. 20 | Ex. 21 | Ex. 22 | Ex. 23 | Ex. 24 | Ex. 25 |
|---|---|---|---|---|---|---|---|
| Isocyanate | LTI | — | — | — | — | — | — |
| | GTI | — | — | — | — | — | — |
| | NTI | ○ | ○ | — | ○5 | ○3 | ○4 |
| | P-1 | — | — | ○ | — | — | — |
| | P-2 | — | — | — | — | — | — |
| | P-3 | — | — | — | ○5 | ○7 | ○6 |
| | P-4 | — | — | — | — | — | — |
| | P-5 | — | — | — | — | — | — |
| Ratio NCO/OH | | 1.1 | 2.2 | 1.5 | 1.5 | 1.5 | 1.5 |
| Coating film hardness | | ○ | ○ | ○ | ◎+ | △ | ◎ |
| Penetration property into lower layer | | △ | ◎ | ○ | ◎ | ○ | ◎ |
| Adhesiveness | | △ | ◎ | ○ | ◎ | ◎ | ◎ |

| | | Ex. 26 | C. Ex. 5 | C. Ex. 6 | C. Ex. 7 | C. Ex. 8 |
|---|---|---|---|---|---|---|
| Isocyanate | LTI | — | — | — | — | — |
| | GTI | — | — | — | — | — |
| | NTI | ○9 | — | — | — | — |
| | P-1 | — | — | — | — | — |
| | P-2 | — | ○ | — | — | — |
| | P-3 | ○1 | — | — | — | ○ |
| | P-4 | — | — | — | ○ | — |
| | P-5 | — | — | ○ | — | — |
| Ratio NCO/OH | | 1.5 | 1.5 | 1.5 | 1.5 | 1.5 |
| Coating film hardness | | ◎ | X | △ | X | △ |
| Penetration property into lower layer | | ◎ | ◎ | X | △ | X |
| Adhesiveness | | ◎ | X | X | X | X |

(Ex.: Example)

TABLE 3

| | | Ex. 27 | Ex. 28 | Ex. 29 | Ex. 30 | Ex. 31 | Ex. 32 |
|---|---|---|---|---|---|---|---|
| Isocyanate | NTI | ○ | ○ | ○5 | ○5 | ○ | ○5 |
| | P-3 | — | — | ○5 | ○5 | — | ○5 |
| Ratio NCO/OH | | 1.5 | 1.5 | 1.5 | 1.5 | 1.5 | 1.5 |
| Heating temperature [° C.] | | 60 | 150 | 60 | 150 | 170 | 170 |
| Coating film hardness | | ○ | ○ | ◎+ | ◎+ | ◎ | ◎+ |
| Penetration property into lower layer | | ◎ | ◎ | ◎ | ◎ | ◎ | ◎ |
| Adhesiveness | | ◎ | ◎ | ◎ | ◎ | ◎ | ◎ |
| Yellowing property when baked | | ○ | ○ | ○ | ○ | X | X |

(Ex.: Example)

The sample coating plates prepared using the second coating compositions containing the isocyanate component containing the triisocyanate as shown in Tables 1 and 2 were excellent in terms of the penetration property of the isocyanate component into the lower layer and the adhesiveness.

The coating film hardness of the sample coating plates prepared using the second coating compositions containing the polyisocyanate components each having an isocyanurate structure formed from LTI or HDI was further improved.

In addition, the adhesiveness and the coating film hardness were improved, and the yellowing property when baked was reduced by controlling the heating temperature.

INDUSTRIAL APPLICABILITY

The coating method according to the present embodiment makes it possible to obtain a coating film having excellent coating film hardness, because the penetration property into a lower layer is favorable.

The invention claimed is:

1. A coating method comprising:
   obtaining a first uncured coating film by applying a first coating composition to a surface of an object to be coated;
   obtaining a second uncured coating film by applying a second coating composition to the first uncured coating film; and
   curing simultaneously the first uncured coating film and the second uncured coating film by conducting heating,
   wherein
   the first coating composition comprises a hydroxyl group-containing resin component and
   the second coating composition comprises:
   an isocyanate component (a) comprising a triisocyanate of general formula (I);
   the hydroxyl group-containing resin component; and
   a polyisocyanate component (b) having an isocyanurate structure formed by at least one isocyanate selected from the group consisting of aliphatic isocyanates and alicyclic isocyanates, wherein a mass ratio (a):(b) of the isocyanate component (a) and the polyisocyanate component (b) is 4:6 to 9:1,

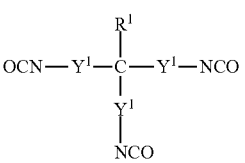

(I)

in the general formula (I), multiple $Y^1$ each independently represents a single bond or a C1-20 divalent hydrocarbon group which may comprise at least one selected from the group consisting of an ester group and an ether group, the multiple $Y^1$ are identical to or different from each other, and $R^1$ is a hydrogen atom or a C1-12 monovalent hydrocarbon group.

2. The coating method according to claim 1, wherein the first uncured coating film and the second uncured coating film are cured simultaneously by the isocyanate component (a).

3. The coating method according to claim 1, wherein, in the second coating composition, a molar ratio (NCO/OH) of an isocyanate group (NCO group) in the isocyanate component, relative to a hydroxyl group (OH group) in the hydroxyl group-containing resin component, is 1.0 to 5.0.

4. The coating method according to claim 1, wherein the triisocyanate comprises an ester group.

5. The coating method according to claim 1, wherein the triisocyanate is a lysine triisocyanate.

6. The coating method according to claim 1, wherein, the first coating composition further comprises an isocyanate component, and, in the first coating composition, a molar ratio (NCO/OH) of an isocyanate group (NCO group) in the isocyanate component, relative to a hydroxyl group (OH group) in the hydroxyl group-containing resin component, is 1.0 or less.

7. The coating method according to claim 6, wherein the isocyanate component comprised in the first coating composition comprises a blocked isocyanate.

8. The coating method according to claim 1, wherein the object to be coated is an uncured coating film.

9. The coating method according to claim 8, wherein the first uncured coating film, the second uncured coating film and the object to be coated are cured simultaneously by the isocyanate component (a).

10. The coating method according to claim 8, wherein, in the second coating composition, a molar ratio (NCO/OH) of an isocyanate group (NCO groups) in the isocyanate component, relative to a hydroxyl group (OH group) in the hydroxyl group-containing resin component, is 1.0 to 5.0.

11. The coating method according to claim 8, wherein the triisocyanate comprises an ester group.

12. The coating method according to claim 8, wherein the triisocyanate is a lysine triisocyanate.

13. The coating method according to claim 8, wherein, the first coating composition further comprises an isocyanate component, and, in the first coating composition, a molar ratio (NCO/OH) of an isocyanate group (NCO group) in the isocyanate component, relative to a hydroxyl group (OH group) in the hydroxyl group-containing resin component, is 1.0 or less.

14. The coating method according to claim 13, wherein the isocyanate component comprised in the first coating composition comprises a blocked isocyanate.

15. The coating method according to claim 1, wherein the triisocyanate is 4-isocyanatemethyl-1,8-octamethylene diisocyanate.

* * * * *